United States Patent
Szobi et al.

(10) Patent No.: US 10,439,873 B2
(45) Date of Patent: Oct. 8, 2019

(54) RELIABLY CONFIGURE ON-PREMISE SERVERS FROM THE CLOUD

(71) Applicant: MICROSOFT TECHNOLOGY LICENSING, LLC, Redmond, WA (US)

(72) Inventors: Kristian Szobi, Seattle, WA (US); Fabian Uhse, Bellevue, WA (US); Andrew J. Wallace, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 15/494,008

(22) Filed: Apr. 21, 2017

(65) Prior Publication Data

US 2018/0309623 A1    Oct. 25, 2018

(51) Int. Cl.
*G06F 15/177* (2006.01)
*H04L 12/24* (2006.01)
*H04L 29/08* (2006.01)

(52) U.S. Cl.
CPC ........ *H04L 41/082* (2013.01); *H04L 41/0853* (2013.01); *H04L 41/0869* (2013.01); *H04L 67/10* (2013.01)

(58) Field of Classification Search
CPC ... H04L 41/082; H04L 41/0859; H04L 67/10; H04L 41/0853; H04L 41/0869
USPC ...................................................... 709/221
See application file for complete search history.

(56) References Cited

U.S. PATENT DOCUMENTS

| 7,702,739 | B1 | 4/2010 | Cheng et al. | |
| 8,799,416 | B2 | 8/2014 | Kim et al. | |
| 2005/0144610 | A1 | 6/2005 | Zenz | |
| 2005/0262225 | A1 | 11/2005 | Halpern et al. | |
| 2016/0080203 | A1* | 3/2016 | Narasimhan | H04L 41/046 709/221 |
| 2017/0201598 | A1* | 7/2017 | Floyd | H04L 67/34 |

OTHER PUBLICATIONS

Westenberg, Guido, "App Configuration Management with Config Servers in Cloud Foundry", https://content.pivotal.io/blog/app-configuration-management-with-config-servers-in-cloud-foundry, Published on: Aug. 6, 2015, 6 pages.
Slama, et al., "Service Oriented Architecture: Inventory of Distributed Computing Concepts", In Publication of Pearson, Dec. 10, 2004, 4 pages.

(Continued)

*Primary Examiner* — Kristie D Shingles
(74) *Attorney, Agent, or Firm* — Workman Nydegger

(57) ABSTRACT

Optimizations are provided for reliably configuring an on-premise server using configuration data stored at a cloud-based service. An on-premise server polls the cloud-based service to determine whether any new configuration changes are available for the on-premise server to implement. In response to an indication that a new configuration change is available for the on-premise server, the on-premise server performs a validation to determine whether the new configuration change is committable by the on-premise server. Afterwards, the on-premise server receives the new configuration change and then attempts to commit to that new configuration change.

20 Claims, 13 Drawing Sheets

(56) References Cited

OTHER PUBLICATIONS

Grønli, et al., "Every Cloud Has a Push Data Lining: Incorporating Cloud Services in a Context-Aware Application", In Journal of Mobile Information Systems, vol. 2015, Oct. 22, 2015, pp. 1-10.
"Runtime Reconfiguration Pattern", https://web.archive.org/web/20140304235844/http:/msdn.microsoft.com/en-us/library/dn589785.aspx, Published on: Mar. 4, 2014, 7 pages.
"Monitor File and Configuration Changes to Physical, Virtual and Cloud-Based Servers", https://www.cimcor.com/cimtrak/products/servers/, Retrieved on: Mar. 16, 2017, 3 pages.
"Azure Service Bus Documentation", https://docs.microsoft.com/en-us/azure/service-bus/, Retrieved on: Mar. 16, 2017, 2 pages.

\* cited by examiner

RELIABLY CONFIGURE ON-PREMISE SERVERS FROM THE CLOUD

BACKGROUND

Computers and computing systems have impacted nearly every aspect of modern living. For instance, computers are generally involved in work, recreation, healthcare, transportation, entertainment, household management, etc.

Normally, a computing system operates using a particular configuration. At a high level, a configuration includes all of the files, directories, dependencies, and/or libraries needed for the computing system to operate in a desired manner. To clarify, the configuration determines how the computing system will function and perform its various operations. As used herein, the terms "system configuration," "computer configuration," "server configuration," and simply "configuration" are interchangeable.

From time to time, the system configuration will be changed. A configuration change may occur, for example, when one or more of the configuration's files, directories, dependencies, and/or libraries are altered such that the configuration has a new "state." To properly categorize and characterize the distinct states of a configuration, versioning techniques are often used. Versioning relates to the process of 1) assigning version identifiers (i.e. identifiers used to differentiate one version from another), 2) maintaining both configuration history and configuration change history, and 3) performing the processes needed so that a computer system can reliably revert from a later version back to an earlier version (if needed) each time a configuration change is introduced. In particular, configuration versioning allows a computer system to remain backwards compatible with previous versions while, at the same time, allowing dramatically new features and configuration options to be introduced to the computer system.

When a configuration change occurs, the corresponding computer system may perform processes for preserving the computer system's existing configuration version. For instance, the system may require each new configuration change to be transactional. In some instances, version identifiers may also be updated to indicate which version the computer system is configured with.

In addition to modifying a computer's configuration, a computer's functionality can also be enhanced by networking with other computing systems via one or more network connections. By way of example, these network connections allow one computing system to remotely access services and/or other content located at one or more other computing systems. In some instances, these services may be operating in a cloud environment such that these services operate remotely from a computer system that is attempting to utilize that service. As used herein, services that operate in a cloud environment are collectively referred to as "cloud-based services."

In some instances, a remote service (e.g., a cloud-based service) can be used to facilitate the various configuration changes (e.g., updates, deletions, or additions) to a computing system's configuration. Currently, however, there exists a substantial need in the field to improve the interrelationship between a remote service and a computing system, particularly with regard to configuration changes. As a result, there exists a substantial need in the field to improve how a remote service is used when managing a computing system's configuration.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

Disclosed embodiments are directed to systems and methods for facilitating the manner in which servers are reliably configured with configuration data provided from cloud-based services.

From the server's perspective, the server initially polls the cloud-based service to determine whether any new configuration changes are available for the server to implement locally. Initially, the server polls the cloud-based service at a predetermined first interval. Also, the server performs this polling process by transmitting a data packet of information relating to an existing configuration version that the server is currently operating at. After a new configuration change becomes available at the cloud-based service, the server receives (from the cloud-based service) certain data that is associated with that new configuration change. Thereafter, the server uses this data to perform a configuration validation. A service reply indicating availability of the new configuration change can also affect the polling interval at the server.

After the server notifies the cloud-based service regarding the configuration validation, the server receives the new configuration change from the cloud-based service. Then, the server commits to the new configuration change by transitioning from its existing configuration version to a proposed configuration version where the configuration change is to be implemented.

From the cloud-based service's perspective, the cloud-based service periodically receives a poll from the server. Here, the cloud-based service is able to determine that the server is inquiring about the availability of any new configuration changes. Further, the server's poll also includes information relating to the server's existing configuration version. After identifying that a new configuration change is available for the server, the cloud-based service provides certain data to the server. This data relates to the new configuration change. Afterwards, the cloud-based service receives validation information from the server. This validation information indicates whether the new configuration change is able to be committed by the server. In response to that validation information, the cloud-based service then provides the new configuration change to the server. Subsequently, the cloud-based service receives a success/failure notification from the server. This success/failure notification indicates whether the server committed to the new configuration change. The cloud-based service also updates a configuration table and may notify the server of this update.

Other optimizations are also provided to cause a server computer system to be reliably configured using configuration data stored at a remote (e.g., cloud-based) service. Here, the server periodically polls the remote service to determine whether any new configuration changes are available at the remote service. This polling includes transmitting data to the remote service. Notably, this data includes information regarding an existing configuration version that the server is currently operating at. After determining that a new configuration change is available at the remote service, the server performs a validation to determine whether the new configuration change is committable by the server. Then, the server notifies the remote service that 1) the remote service is to perform a configuration rollback or 2) the validation returned a successful result. The various embodiments described herein are presented as computer systems, hardware storage media, and methods.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
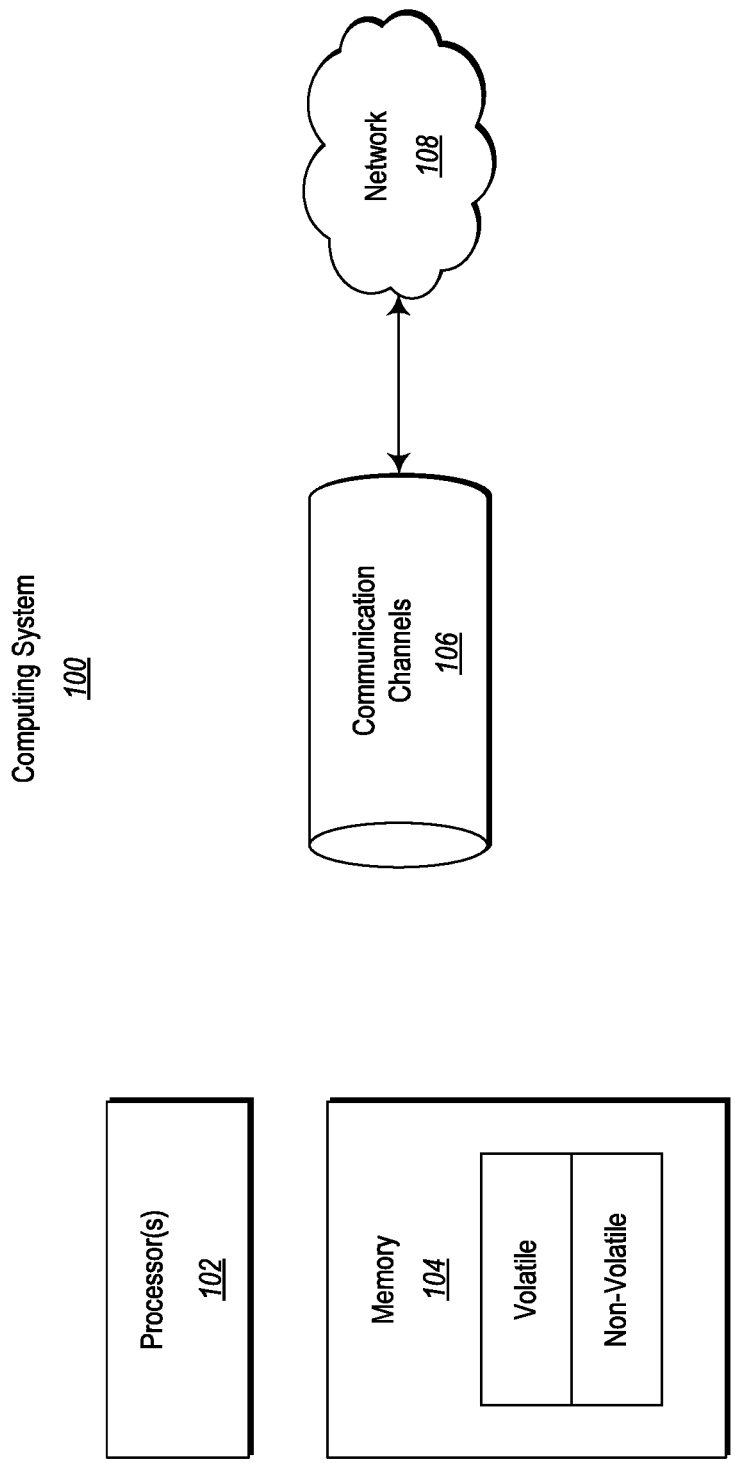
FIG. 1 illustrates an abstract view of a computer system.

Disclosed embodiments are directed to systems and methods for facilitating the manner in which servers are reliably configured with configuration data stored at a cloud-based service utilizing a stateless protocol.

The embodiments may be implemented to overcome many of the technical difficulties and computational expense associated with configuring systems through cloud-based services. In particular, the embodiments enable a server in a distributed system (or a group of servers) to be securely, reliably, and robustly configured in a manner that does not require additional hardware (or virtual ware) and in a manner that is consistent with existing security infrastructure. Further, the present embodiments are able to configure an on-premise server even without the use of a gateway or an intervening proxy server. Still further, the present embodiments operate to ensure that both an on-premise server and a cloud-based service have a same understanding of what configuration version the on-premise server is operating at. As a result, the present embodiments provide for easier and cheaper deployments of server configuration systems.

The present embodiments are also able to provide more reliable transactions between a cloud-based service and an on-premise server because of the polling techniques described herein. By way of example, if a cloud-based service were to continually "push" configuration changes to an on-premise server, the cloud-based service might never accurately learn whether the on-premise server properly implemented those changes. By using the polling techniques described herein, the present embodiments are able to more efficiently and more reliably enable a cloud-based service to work with an on-premise server to ensure that the on-premise server is properly configured. By providing these advantages, the present embodiments are able to not only improve how a computer system operates (e.g., by improving receipt and implementation of a configuration change) but are also able to improve the administrator's experience (e.g., by providing quick and reliable updates on the progression and implementation of any configuration changes). These and other benefits of the present embodiments will be discussed more fully hereinafter.

The disclosed embodiments for reliably configuring a server computer system using configuration data stored at a cloud-based service are described separately, herein, from the perspective of the server and from the perspective of the service.

From the server's perspective, the server polls the cloud-based service at a first predetermined interval to determine whether any new configuration changes are available at the cloud-based service. The server performs this polling process by transmitting a data packet that includes information relating to an existing configuration version that the server is currently operating at. After a new configuration change becomes available at the cloud-based service, the server receives (from the cloud-based service) certain data that is associated with that new configuration change. In some embodiments, this action triggers the server such that qualifying future polls for configuration change data are performed at a second/faster polling interval. In these embodiments, any future polling (i.e. inquiring whether a new configuration change is available) at this second/faster polling interval is performed only after all of the steps involved in effectuating a current configuration change have been performed to completion (either successfully or otherwise). If, after completely managing a first configuration change, additional configuration changes are introduced, then the server will poll at the second/faster polling interval. If no additional configuration changes are introduced during a subsequent predetermined time period, however, then the server may fall back to its normal polling frequency. This subsequent predetermined time period can be any time period (e.g., 30 seconds, 1 minute, 2 minutes, 5 minutes, or any other duration).

The server uses the data received from the service, corresponding to configuration changes, to perform configuration validation. Afterwards, the server notifies the cloud-based service regarding the configuration validation (e.g., a result of the configuration validation). Subsequently, based on the validation notification, the server receives the new configuration change(s) from the cloud-based service as soon as the cloud-based service is able to transmit those changes. Then, the server commits to the new configuration change by transitioning from its existing configuration version to a proposed configuration version where the configuration change is to be implemented.

From the cloud-based service's perspective, the cloud-based service periodically receives a poll from the server. Here, the cloud-based service is able to determine that the server is inquiring about the availability of any new configuration changes and/or that the server is requesting the new configuration changes. Further, the server's poll also includes information relating to the server's existing configuration version. After identifying that a new configuration change is available for the server, the cloud-based service provides certain data to the server. This data relates to the new configuration change. Afterwards, the cloud-based service receives validation information from the server. This validation information indicates whether the new configuration change is able to be committed by the server. In response to that validation information, the cloud-based service then provides the new configuration change to the server. In some instances, the service only provides the new configuration change(s) corresponding to the validation information in response to a subsequent poll/request. In other embodiments, the new configuration change(s) are provided automatically in response to receiving the validation information.

Subsequently, the cloud-based service receives a success/failure notification from the server. This success/failure notification indicates whether the server committed to the new configuration change. Thereafter, the cloud-based service updates a configuration table managed by or that is at least accessible to and updatable by the service. In some instances, the service also notifies the server of this update.

Other optimizations are also provided to cause a server computer system to be reliably configured using configuration data stored at a remote (e.g., cloud-based) service. Here, the server periodically polls the remote service to determine whether any new configuration changes are available at the remote service. This polling includes transmitting data to the remote service. Notably, this data includes information regarding an existing configuration version that the server is currently operating at. After determining that a new configuration change is available at the remote service, the server performs a validation to determine whether the new configuration change is committable by the server. Then, the server notifies the remote service that 1) the remote service is to perform a configuration rollback to a configuration version that is currently being used by the server or 2) the validation returned a successful result. The various embodiments described herein are presented as computer systems, hardware storage media, and methods. It will be appreciated that the disclosed embodiments include any combination of the features and aspects described herein.

Initially, this disclosure will focus on FIG. 1, which presents an introductory discussion of an exemplary computing system. Following that discussion, various architectures and supporting architectures will be discussed using FIGS. 2-6. Lastly, various flow diagrams, additional architectures, and methods will be detailed with respect to the remaining figures (FIGS. 7A through 12).

As illustrated in FIG. 1, an exemplary computing system 100 includes, in its most basic configuration, at least one hardware processor 102 and memory 104. The memory 104 may be physical system memory, which may be volatile, non-volatile, or some combination of the two. The term "memory" may also be used herein to refer to non-volatile mass storage such as physical storage media. If the computing system 100 is distributed, the processor 102, memory 104, and/or storage capability may be distributed as well. As used here, the term "executable module," "executable component," or even "component" can refer to software objects, routines, or methods that may be executed on the computing system. The different components, modules, engines, and services described herein may be implemented as objects or processors that execute on the computing system (e.g., as separate threads).

Embodiments of the present invention may comprise or utilize a special-purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

The computer system 100 also includes one or more communication channels 106 for communication with a network 108. A "network" (e.g., the network 108) is defined as one or more data links that enable the transport of electronic data between computer systems and/or modules and/or other electronic devices. When information is transferred, or provided, over a network or another communications connection (either hardwired, wireless, or a combination of hardwired or wireless) to a computer, the computer properly views the connection as a transmission medium. Transmissions media can include a network and/or data links which can be used to carry out desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa).

For example, computer-executable instructions or data structures received over a network or data link can be buffered in RAM within a network interface module (e.g., a "NIC") and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Figure 2:
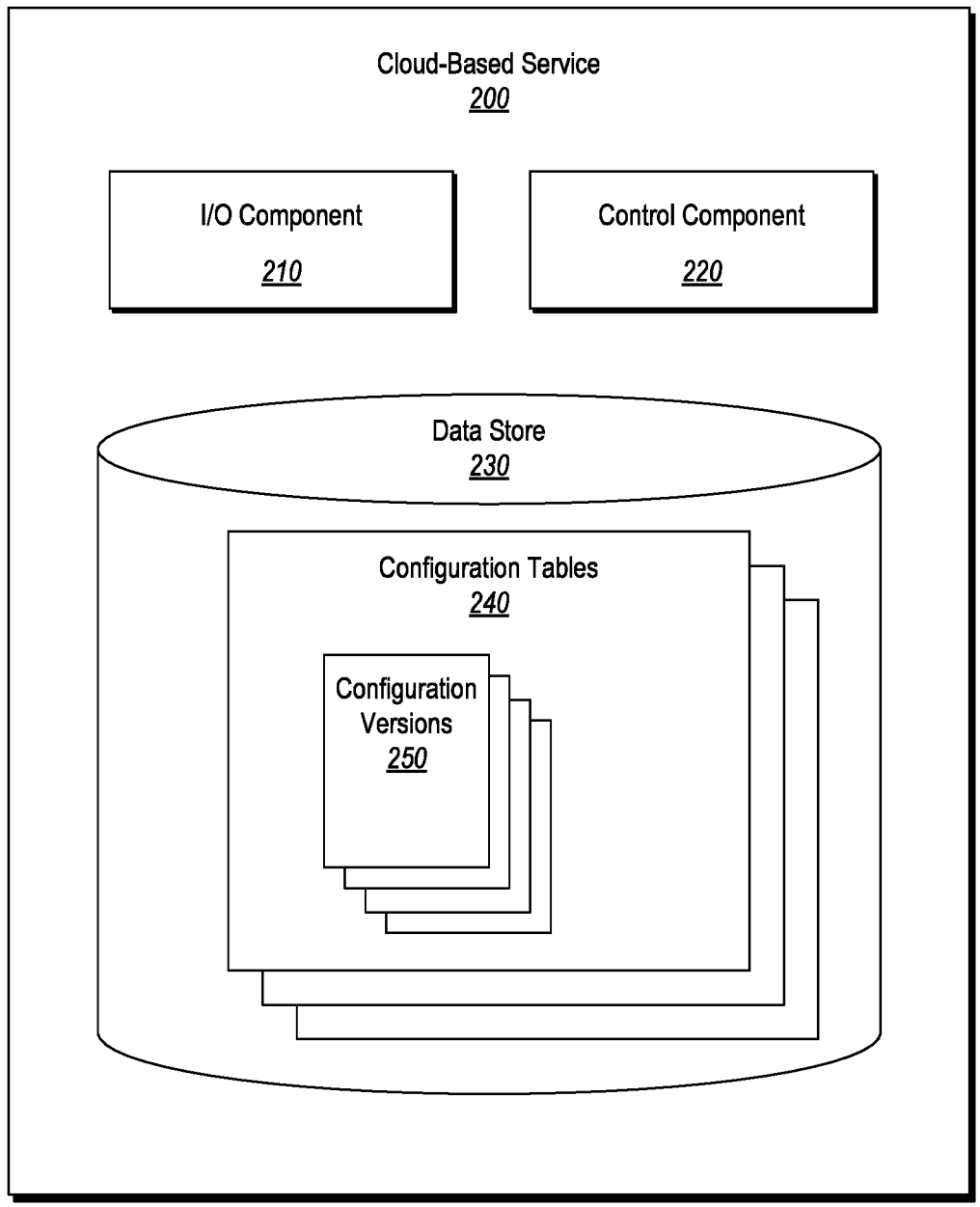
FIG. 2 illustrates an exemplary cloud-based service that can be used to reliably configure an on-premise server.

As detailed above, computer systems are able to provide a broad variety of different functions. One such function includes a cloud-based service. For example, FIG. 2 presents a cloud-based service 200 that is implemented by a computer system (e.g., the computer system 100 of FIG. 1). This cloud-based service 200 is used to configure one or more on-premise servers (e.g., a server located at an enterprise's own data center, which may also be configured as computer system 100 of FIG. 1). As used herein, "on-premise server" and simply "server" are interchangeable terms.

As shown in FIG. 2, the cloud-based service 200 includes an input/output ("I/O") component 210, a control component 220, and a data store 230. This data store 230 includes various configuration tables 240 which themselves may include one or more configuration versions 250 which includes pointers or other data that identify/track which servers are utilizing which configuration versions 250. The embodiments presented herein provide a cloud-centric management experience. Therefore, instead of requiring an administrator to configure two separate systems (e.g., a service that has one toolset and a server that has a different toolset), which process is complex and time consuming on the Administrator's part, the present embodiments enable a user to configure a server from a central location, which will be discussed in more detail later.

The present embodiments employ the versioning principles discussed earlier. In particular, the configuration versions 250 illustrate that an underlying on-premise server's configuration has been modified in some manner. To clarify, each time a configuration change is introduced, a new configuration version is published and the configuration changes are made available at the cloud-based service for retrieval by an on-premise server.

It will be appreciated that the cloud-based service 200 performs operations in a "transactional" or stateless manner. As used herein, the terms "stateless" and "transactional" are interchangeable. By transactional, it is meant that the cloud-based service 200 processes information and performs work by dividing computing operations into individual and indivisible discrete units of work or transactions. By having this transactional (i.e. stateless) ability, the cloud-based service 200 is able to more fully ensure that operations are performed correctly, even if an error or other impediment occurs during its normal processing. Further, being transactional enables a computer system to undo any changes that are imposed upon it. Still further, being transactional means that an operation is either completed in its entirety or that operation is cancelled in its entirety. Accordingly, the versioning techniques described herein are transactional.

Figure 3:
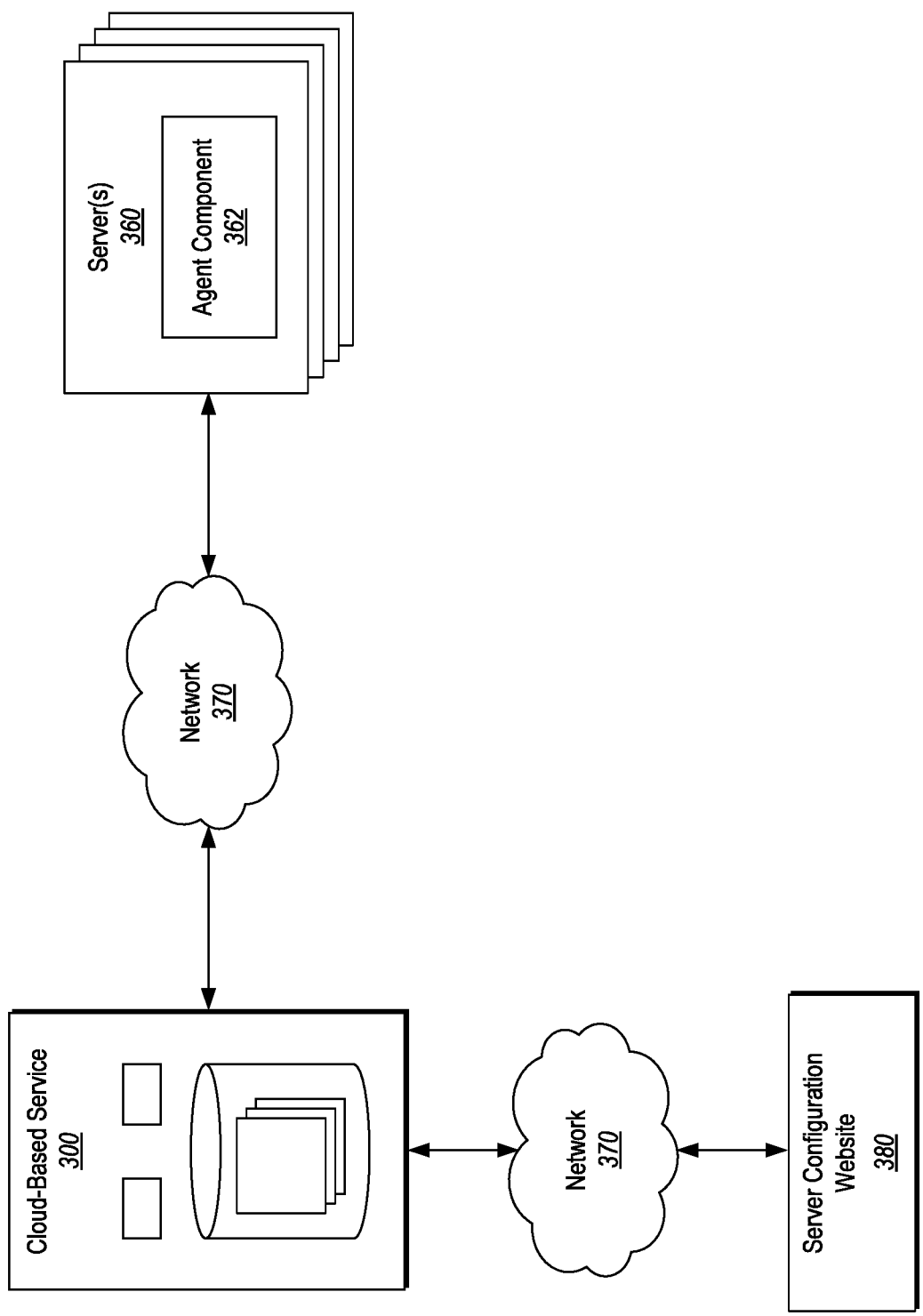
FIG. 3 illustrates an example environment of a cloud-based service communicating with various servers and a server configuration website.

FIG. 3 shows a cloud-based service 300 configured in a manner similar to the cloud-based service 200 of FIG. 2. FIG. 3 also illustrates that the cloud-based service 300 is able to interact with one or more servers 360, where each server includes a corresponding agent component 362, via a network 370. Furthermore, the cloud-based service 300 can also use the network 370 to interact with a server configuration website 380 which is hosted by the service 300, a third party system, or an administrator computing system. The website 380 is accessible by an administrator system (not shown). Although the scenarios presented herein focus on the use of a website, the embodiments should not be limited to only that particular input option. Instead, any type of command line interface may be used to enter configuration changes. Therefore, although the following disclosure refers to a website, the present embodiments are able to support any type of user interface (e.g., a command line console, a script engine, a mobile client, etc.).

Similar to the cloud-based service 200 of FIG. 2, the cloud-based service 300 is used to reliably configure servers (e.g., the servers 360). To facilitate this configuring, the cloud-based service 300 interacts with the server configuration website 380 (or a similar user interface construct). To clarify, a user (e.g., an administrator) is able to login to the server configuration website 380 and interact with the server configuration website 380's user interface (e.g., through various command lines) to modify, update, or potentially even replace a server's configuration. Modifying, updating, or replacing a server's configuration constitutes a "configuration change."

The cloud-based service 300 maintains information about each servers' configuration and versions, such as in the configuration tables 240. Each server also maintains information about its own configuration and versions as well. To clarify, an administrator determines a server's configuration by interrogating and interacting with the service via the server configuration website and not directly with the server. In some embodiments, a periodic action may also be established using the server configuration website. For instance, some embodiments schedule periodic tasks that a server is to perform (e.g., run a backup at a certain predetermined interval). As a result, the server configuration website can also be used to inject system generated commands on a regular basis.

In addition to maintaining information, the cloud-based service operates as the controlling entity with regard to managing each servers' configuration. Notably, the present embodiments are able to ensure that both a server and the cloud-based service have a same understanding of what configuration version the server is supposed to be operating at. Therefore, any configuration change introduced by the administrator through the server configuration website 380 is recorded in one or more of the configuration tables of the cloud-based service 300 and is made available for retrieval by a server. Furthermore, a new configuration version (which illustrates that a configuration change has been made) is also transmitted according to the principles described earlier.

Each time the cloud-based service 300 is introduced (for a first time) to a new server, the cloud-based service 300 creates a configuration table for that new server. By way of example, suppose the cloud-based service 300 is interacting with five different servers (e.g., serverA, serverB, serverC, serverD, and serverE). At the first interaction, the cloud-based service 300 establishes, or configures, a unique configuration table for each of those individual servers. These configuration tables provide data segregation and independence. Further, these configuration tables 1) provide historical data on changes to a server's configuration, 2) make configuration changes available to a server for retrieval, and 3) publish, or advertise, the existence of a new configuration version, which version illustrates that a configuration change has been made.

Continuing with the example, the cloud-based service 300 will establish tableA, tableB, tableC, tableD, and tableE, where tableA corresponds to serverA, tableB corresponds to serverB, and so on. Accordingly, each configuration table maintains the corresponding server's configuration versions. Although the above example presented a scenario where five servers and five configuration tables were used, the embodiments are able to support any number of servers and can create any number of corresponding configuration tables. For instance, in some embodiments, the service 300 manages a separate table for each server, even when servers share common configurations, regardless of the number of servers/tables. In alternative embodiments, the service 300 manages pointers that associate different servers to different configurations/tables, such that different servers share common tables/configurations and then the service 300 changes the pointer to newer configurations/tables when the newly associated servers undergoes configuration changes that correspond to the newer configurations/tables.

Figure 4:
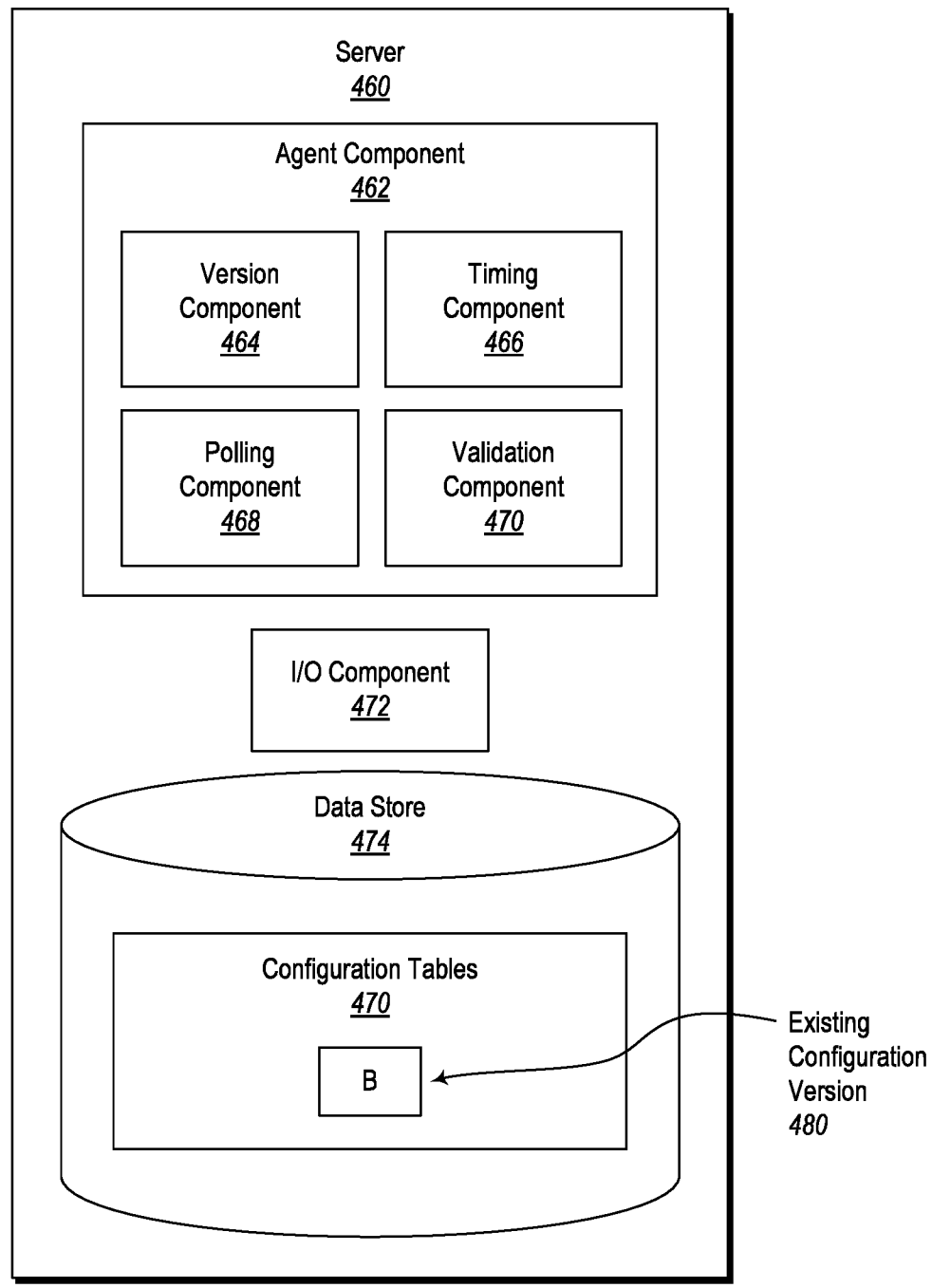
FIG. 4 illustrates an exemplary server that is able to communicate with a cloud-based service.

Turning briefly away from FIG. 3, FIG. 4 illustrates a more detailed view of a server 460 that is included among the servers 360 of FIG. 3. In particular, FIG. 4 shows that a server 460 includes an agent component 462. This agent component 462 further includes various other components. For instance, the agent component 462 is illustrated as including a version component 464, a timing component 466, a polling component 468, and a validation component 470. The attributes and features of the agent component 462 as well as the various subcomponents will be described in more detail later. Notably, however, FIG. 4 also shows that the server 400 includes an I/O component 472. This I/O component 472 is used by the server 460 to communicate with various other computing systems and/or services (e.g., the cloud-based service 300 from FIG. 3). Additionally, server 460 includes a data store 474. This data store 474 includes a local configuration table 470 that maintains information on the server 460's configuration, including the server's existing configuration version 480 (e.g., version "B" in FIG. 4).

Returning to FIG. 3, an administrator can use the server configuration website 380 to introduce configuration changes (e.g., by modifying, updating, or potentially even replacing) to a server's configuration. To introduce such a change, the administrator inputs his/her desired configuration changes via a command interface at the server configuration website 380. It will be appreciated that the server configuration website 380 includes various menus and options to enable the administrator to properly select the desired server and to input, or introduce, those desired configuration changes. When configuration changes are made, a proposed configuration version will also be created and will be published at the cloud-based service 300. Further, the configuration changes will be made available for retrieval at the cloud-based service 300 by a server. As a result, any new configuration changes are remotely delivered from the server configuration website through the cloud-based service to an on-premise server.

Although the above example presented a scenario where an administrator entered configuration changes for only a single server, it will be appreciated that the server configuration website 380 can also be used to simultaneously enter configuration changes for a plurality of servers. For example, in some situations, a group of servers may be using a similar configuration, and in particular a similar configuration version. Here, the administrator can select all of the servers in that group by using various options, selections, and/or menus provided by the server configuration website 380. After selecting the group of servers, the administrator can then enter a single (or multiple) configuration change(s) which will then cause a proposed configuration version to be created for each server. These proposed configuration versions will then be published at the cloud-based service 300 and the configuration changes will be made available for retrieval by each server in the group. To further elaborate, the embodiments are usable to configure a cluster of servers. A cluster is a group of servers that act together to support workloads at a higher level of reliability than would be possible for one server acting alone, or at a high level of scale.

Notably, these configuration changes will be stored in each server's corresponding configuration table in the cloud-based service 300. Further, a proposed configuration version will be created for each server to reflect that a configuration change has been created (e.g., a configuration version identifier may be updated to reflect the new configuration changes). Afterwards, those servers will independently poll the cloud-based service 300 to retrieve those configuration changes. Then, those servers will implement the configuration changes locally to thereby operate at the proposed configuration version. Therefore, in view of this disclosure, an administrator can simultaneously introduce configuration change(s) to a plurality of servers through use of the server configuration website 380.

Some embodiments utilize Etags. Etags may be incorporated with each configuration, configuration change, and/or configuration version. For example, when a new configuration change is introduced, some embodiments will generate an Etag and include it within the resulting version. As used herein, an Etag is an identifier that can be used to differentiate one set of data (e.g., a version) from another set of data (e.g., a later version). Etags can include metadata, a file header, and/or a file name. Etags may also include a name for the data set (e.g., a name for a version). Even further, an Etag may include a data set's creation date and time, or even information usable to identify the creator of the data set (e.g., an administrator's name, username, title, etc.). Etags may be used for an entire configuration, a configuration change, and/or a configuration version.

Figure 5:
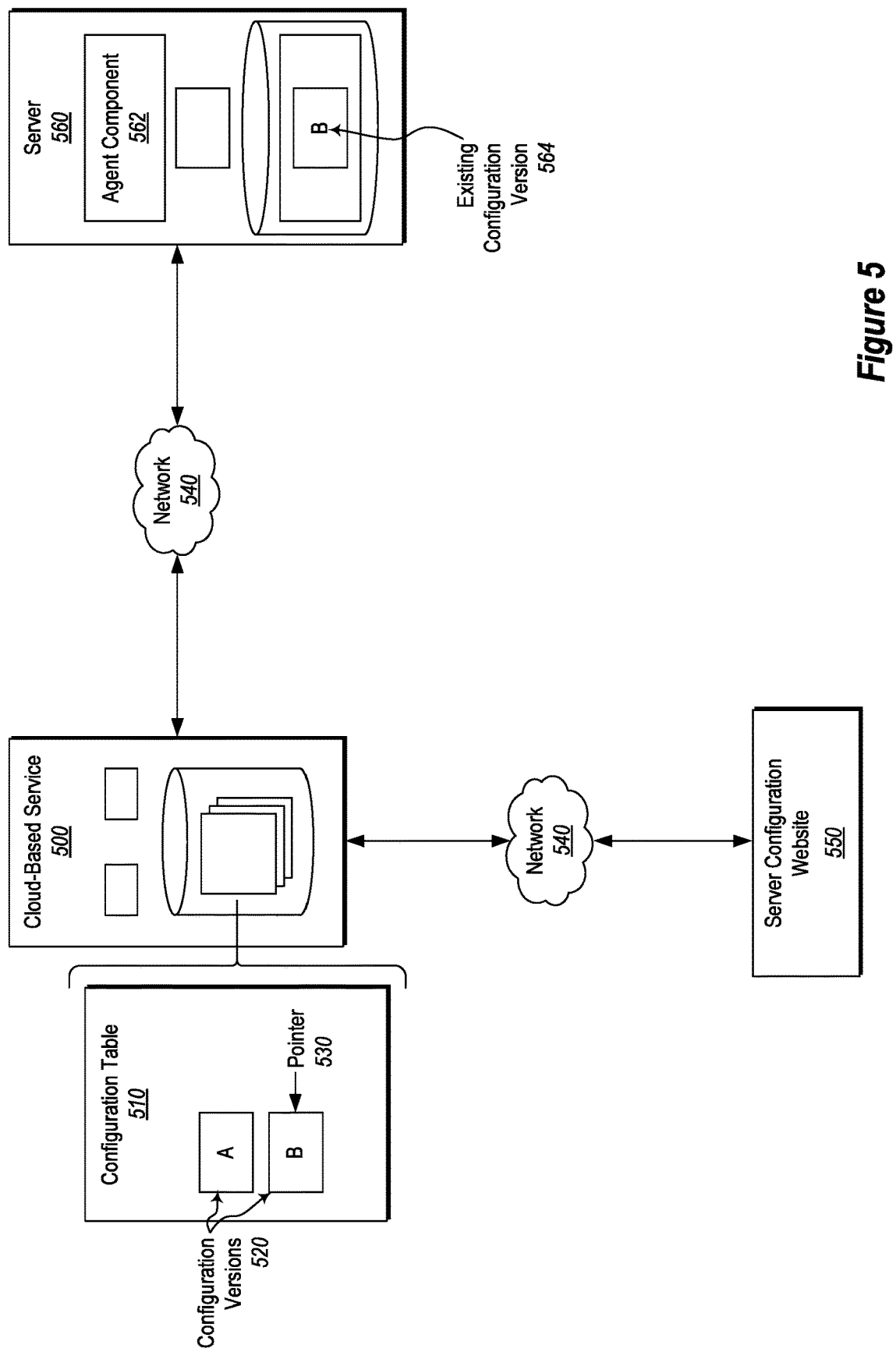
FIG. 5 provides further detail on an example environment where a cloud-based service communicates with a server and a server configuration website.

FIG. 5 further expands on the scenarios introduced so far. In particular, FIG. 5 presents a cloud-based service 500 similar to the cloud-based service 300 of FIG. 3. Here, the cloud-based service 500 is shown as including a configuration table 510 and various configuration versions 520 (e.g., versions "A" and "B"). Within the configuration table 510, a pointer 530 is illustrated as pointing to a current server configuration version "B." Similar to FIG. 3, FIG. 5 also shows a network 540 and a server configuration website 550. FIG. 5 also shows a server 560 that includes an agent component 562 and information on the server's configuration, which includes the server's existing configuration version 564 (e.g., version "B").

It will be appreciated that configuration table 510 is associated with, or rather has a relationship with, server 560. Here, configuration table 510 has been configured to operate exclusively for server 560. As a result, the configuration versions 520 are the server 560's versions. Furthermore, in the scenario presented in FIG. 5, the pointer 530 is currently pointing to version "B," which means that the server 560 should either be currently operating at that version or is intended to operate at that version. As illustrated, server 560's current configuration version 564 is the same as that to which the pointer 530 is pointing. In other words, server 560 is operating at version "B."

At a time prior to that shown in FIG. 5, an administrator made various configuration changes to server 560's configuration. To clarify, server 560 was previously operating at version "A." Now, as illustrated, server 560 is supposed to be operating at version "B." At a prior time, the administrator introduced a configuration change via the server configuration website 550. As a result, version "B" was created and published, and the configuration changes were made available in configuration table 510. In response to the presence of version "B," the pointer 530 transitioned from pointing at version "A" to now point at version "B." Subsequently, and in response to the pointer 530's transition, server 560 incorporated those configuration changes and is now operating at version "B." Detail on how the server 560 performed this incorporation will be provided later.

It will be appreciated that a new configuration change may be applicable to only a single server or, alternatively, it may be applicable to many different servers. Regardless of how many servers a new configuration change may be applicable to, the embodiments retain those new configuration changes in the appropriate configuration tables. By way of example, the configuration changes of version "B" are stored in configuration table 510, which is specifically configured for server 560. Alternatively, the configuration changes of version "B" may be propagated to a plurality of other configuration tables that correspond to a plurality of other servers (e.g., the administrator may have selected a group of servers to which version "B" is now applicable to).

Figure 6:
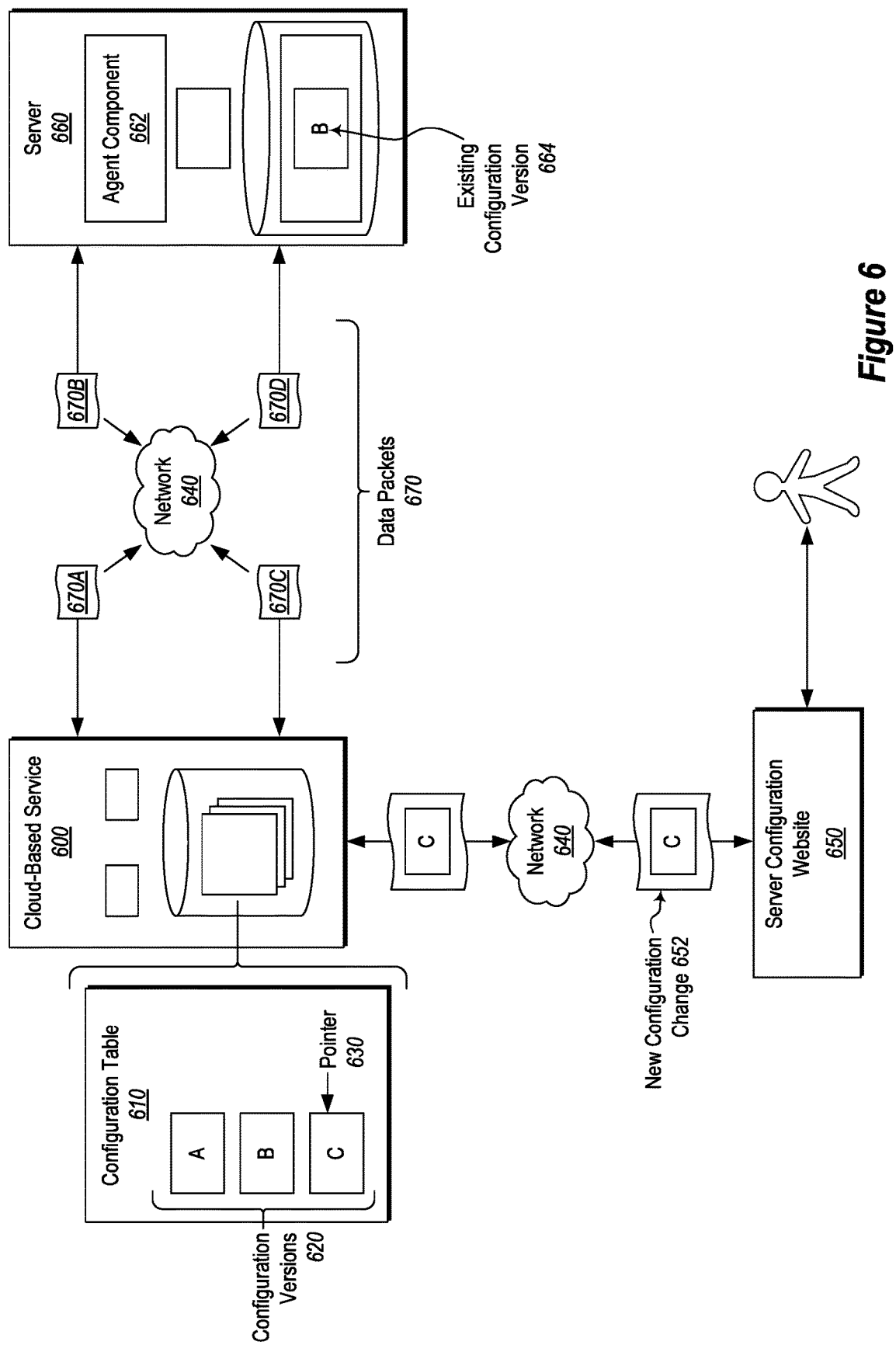
FIG. 6 provides even further detail on an example environment where a cloud-based service communicates with a server and a server configuration website.

To elaborate further on configuration changes, FIG. 6 presents a situation in which a new configuration change becomes available.

In particular, FIG. 6 illustrates a cloud-based service 600 that is analogous to the cloud-based service 500 of FIG. 5. Similar to the cloud-based services that were introduced earlier, cloud-based service 600 includes a configuration table 610 which itself includes various configuration versions 620 (e.g., versions "A," "B," and "C"), and a pointer 630. The server configuration versions 620 correspond with various configuration changes that were introduced at previous times.

FIG. 6 also shows that the cloud-based service 600 communicates via a network 640 with a server configuration website 650. As demonstrated in FIG. 6, an administrator may interact with the server configuration website 650 to modify, update, or even replace a server's configuration. Stated differently, the administrator may use the server configuration website 650 to introduce configuration changes to a server's configuration. Here, the administrator is introducing a new configuration change 652. The administrator's actions cause 1) version "C" to be published and 2) the configuration changes to be made available in the configuration table 610. To clarify, version "C" illustrates that a new configuration change 652 has been made. In response to the new configuration change 652 of version "C," the pointer 630 transitions from pointing at version "B" to version "C." Here, version "C" represents a "proposed configuration version."

In response to the pointer 630 pointing to version "C," a corresponding on-premise server 660, which includes an agent component 662 and an existing configuration version 664 (e.g., version "B"), may attempt to implement the changes necessary to convert, or transition, from version "B" to version "C" according to the processes that will be described later. In the scenario presented in FIG. 6, the configuration table 610 has been configured exclusively for server 660. Also, by way of clarification, FIG. 6 presents a scenario in which the new configuration change 652 of version "C" is available, but the server 660 has not yet implemented it. As a result, the server 660 is still operating at version "B."

When communication occurs between the cloud-based service 600 and the server 660, various data packets 670 (e.g., data packet 670A, 670B, 670C, and 670D) are transmitted back and forth between the server 660 and the cloud-based service 600 to enable the server 660 to acquire the new configuration change 652 of version "C," which version "C" constitutes as a proposed configuration version. These data transmissions are performed to ensure that the server 660 reliably acquires the new configuration change 652 of version "C." In some embodiments, the configuration change 652 has associated therewith an expiration period. For instance, if the server does not poll the service for the new configuration change 652 within some predetermined period of time (e.g., 5 minutes, 10 minutes, 15 minutes, etc.), then the new configuration change 652 will time out and the service will drop it or it will no longer be associated with the server.

Now, further detail will be provided on how the cloud-based service 600 and the server 660 interact with each other to reliably configure the server with configuration data from a service. In particular, the server 660 uses a stateless (i.e. transactional) request-response protocol to communicate with the cloud service 600 to support the transactional nature of versioning and server configuration changes. This protocol is a lightweight distributed transactional protocol that allows for rollback. As introduced earlier, the present embodiments perform transactional operations with regard to any configuration changes. By using a stateless protocol, the embodiments view each request and response as a unique and independent transaction.

The protocol is "lightweight" in that it is a stateless request/response protocol where no channel or other heavyweight protocol is needed, which heavyweight protocol locks resources at both the server end and the service end and/or in the middle for the duration of the configuration management action or (in some situation) for the lifetime of the configuration management relationship. The protocol is "distributed" in that the configuration data impacts components that are separated in space. Further, the protocol is "transactional" in that both components must commit data to storage for a change to be considered successfully complete. As a result, either both the server and the service commit to a configuration change or both are required to reject the configuration change. Rollback will be discussed in more detail later. Briefly, however, the protocol is associated with rollback in that if either the server or the service fail to make a configuration change, then the server and service both move back to an existing configuration version in which the configuration change is not to be implemented. Accordingly, by using a stateless protocol, communications between a server and a service comprise one or more independent request and response packets of information.

Notably, the server 660 drives this stateless request-response protocol while the cloud-based service 600 drives the management of any configuration changes. Further, the request-response protocol is gateway-agnostic, meaning the protocol does not require a gateway to be implemented and can be performed even when faced with different types of gateways or even no gateway at all. Similarly, the protocol is tolerant of server proxies, meaning the protocol can be used when an intermediary (i.e. "proxy") server is situated between the server 660 and the cloud-based service 600. Furthermore, the protocol can be implemented even in the absence of a proxy server. As a result, the request-response protocol enables the server to act as a client to obtain configuration information from the cloud-based service by reaching out to the cloud-based service to thereby circumvent the use of a proxy server, a special firewall, and/or particularized routing configurations.

To implement this stateless request-response protocol, the server 660 is tasked with initially "polling" the cloud-based service 600. By "polling," it is meant that the server 660 initiates and transmits a request, and the cloud-based service 600 responds to that server-initiated request as soon as it is able to. To clarify, the embodiments utilize a defined management system whereby the server reaches out to the service. Here, the reason for polling (as opposed to some other communication process, for example a "push" method) is that it is can be easier for an inside server (e.g., an on-premise server located within an enterprise) to navigate and pass through its own enterprise proxies and firewalls than it is for an outside service (e.g., the cloud-based service 600) to reach into the enterprise's network. Stated differently, it is much easier for the server 660 to reach out to the Internet than it is for the cloud-based service 600 to force its way from the Internet to the server 660. Even further, when the server 660 reaches out to the cloud-based service 600 via the polling operation, the server 660 can use a standard network port to perform this process. If, however, the cloud-based service 600 were required to push content to the server 660, then a new port would need to be opened at the server 660, which new port may provide an additional avenue for potential hacking malfeasance. As a result, the present embodiments avoid the security risks and infrastructure configuration difficulties of deploying a system that permits an outside entity to reach into the server from outside an organization and make management level changes to the server (such a solution would be a deployment blocker for many users). Accordingly, the present embodiments utilize a polling operation (i.e. the stateless request-response protocol described above) to optimize communications between the server 660 and the cloud-based service 600.

Figure 7A:
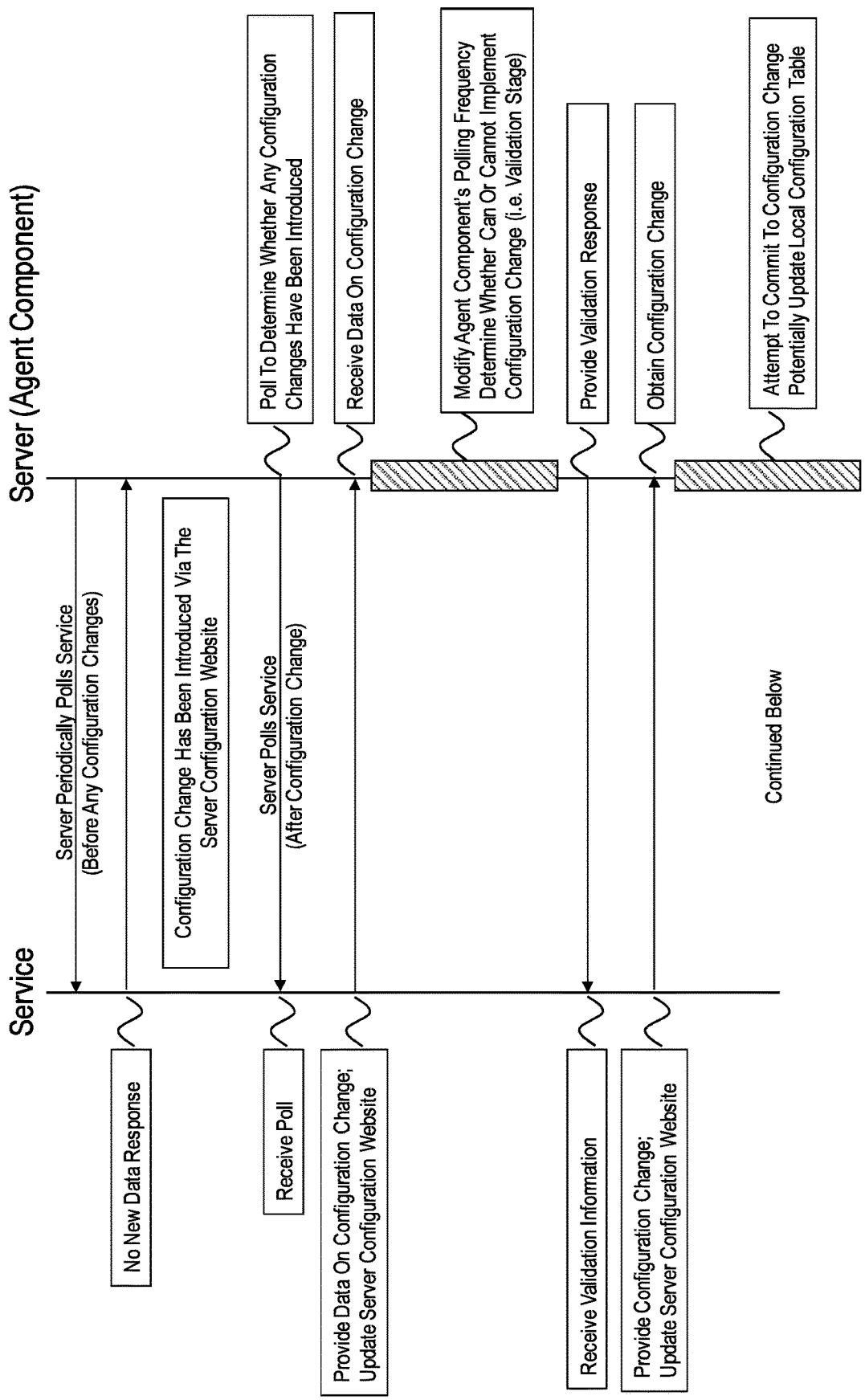
FIG. 7A illustrates various communications and actions that are performed by a server and a service.
Figure 7B:
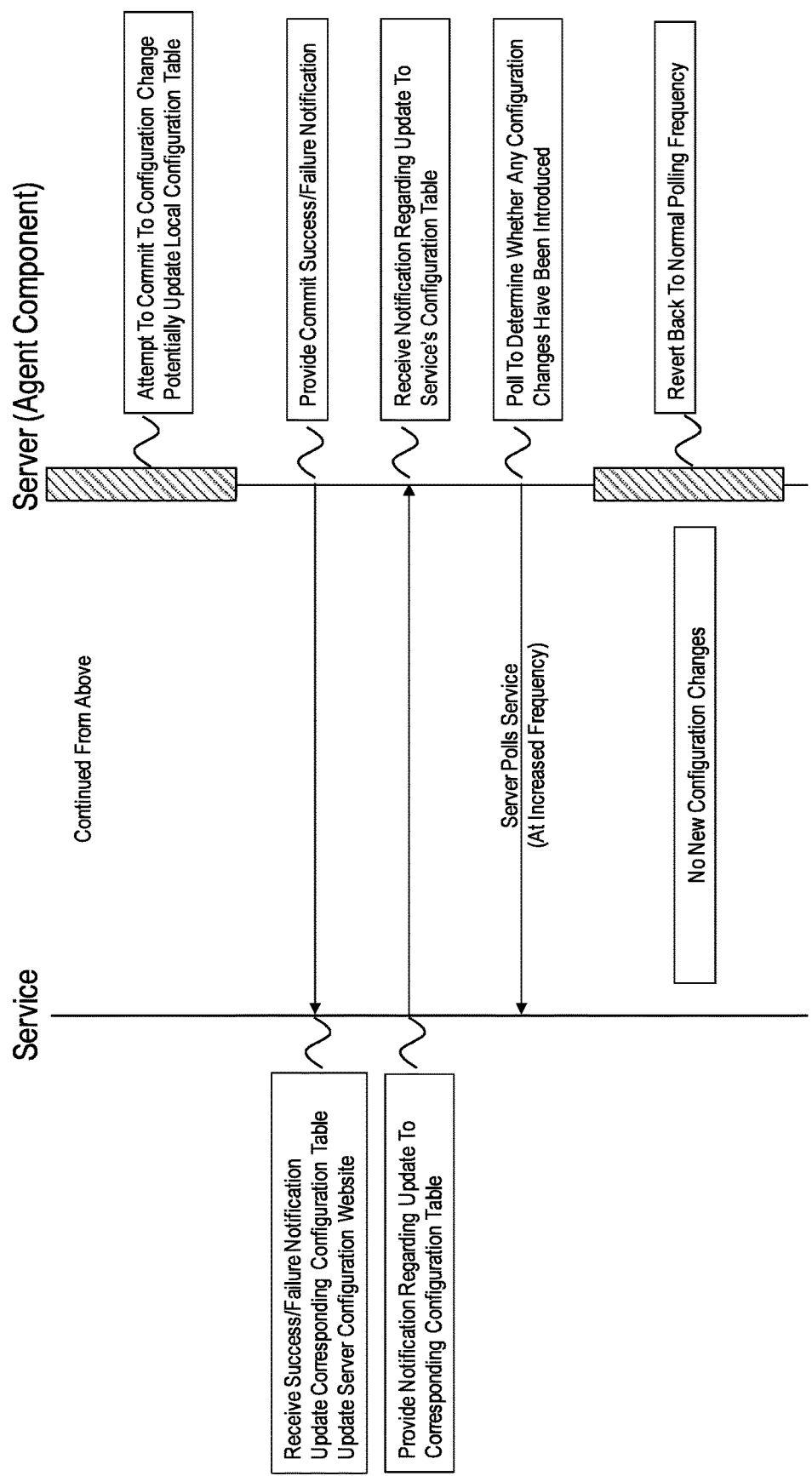
FIG. 7B illustrates additional communications and actions that are performed by a server and a service.

This response-request protocol, which includes an initial poll by the server, is further illustrated in FIGS. 7A and 7B.

Specifically, FIG. 7A illustrates a service (e.g., the cloud-based service 600 of FIG. 6) and a server (e.g., the server 660 of FIG. 6). Initially, the server begins the response-request protocol by polling the service (e.g., by sending a stateless request). Although FIG. 7A shows that this polling is performed periodically (e.g., every one or more second, every few seconds, every 10 seconds, 20 seconds, 30 seconds, or other duration), this may not always be the case. To clarify, the server can poll the service at any interval, whether at a periodic interval or at a non-periodic interval. Further, future polls are performed only after the processes involved with managing a new configuration change are complete (whether the change was successfully committed or otherwise).

Regardless of what interval the server is following, this polling occurs before any configuration changes are introduced by an administrator using the server configuration website 650 in FIG. 6. Because no configuration changes have yet been introduced, the service can either ignore the server's poll, or alternatively, the service can transmit a response indicating that a proposed configuration version has not yet been created.

When the server polls the service, the server's poll includes various pieces of data. To elaborate, when the server polls the service, the server may transmit the server's identity (e.g., the server's name, manufacturer, model, physical and/or network location, enterprise information, or any other identifying information) to the service. Further, the server's poll may include an Etag that includes information about the server's existing configuration version (e.g., a Configuration-Version-Identifier). As a result, an Etag may be used to identify version mismatches between version information located at the service and version information located at the server.

Here, it is worthwhile to note that at a prior time, the server and the service performed a registration process to validate, or rather to establish, a trust relationship with each other. When this trust relationship was initially created, the server registered with the service (and vice versa) by transmitting identifying information so that the two entities will be able to recognize each other at later points of time using the identifying information. During this initial process, the service also creates or identifies a configuration table for the server, which configuration table will be used to maintain the server's configuration history, configuration data, configuration changes, configuration versions, and any other information relevant for the service to manage the server's configuration. The service stores the server's identifying information in one of the cloud-based service's configuration tables (specifically the configuration table that was created exclusively for the server). Similarly, the server either creates or has already created its own configuration table (e.g., configuration table 470 in FIG. 4), which is used to locally track and maintain the server's own configuration, including the versions. Additionally, the server's own configuration table may store the service's identifying and authenticating information.

When establishing the trust relationship, various processes may be used. For instance, some embodiments pass certificates, or keys, between the server and the service in an effort to initially build the trust. In contrast, other embodiments require a manual process where an administrator is required to be involved in the process. Still other embodiments allow the process to be performed automatically through conventional authentication procedures known in the art. Regardless of how the process is performed, the server and the service establish a trusting relationship to thereby facilitate future communications and operations.

Returning to the data that is included in the server's poll, the server's poll also includes data relating to what configuration version the server is currently operating at (i.e. its existing configuration version). This data is stored in a local configuration table managed by the server itself. As discussed above, however, an administrator is able to modify, update, or even replace a server's configuration by introducing a configuration change using the server configuration website according to the processes described earlier. To enable the service to know what configuration version the server is actually operating at (i.e. the server's existing configuration version), the server transmits information related to its own understanding of its existing configuration version. In other words, the server consults its own configuration table and then transmits some of the configuration table's information to the service via the server's poll.

By way of example, the server may transmit a version number, a version letter (e.g., "A," "B," "C," etc.), or any other information usable to identify the server's existing configuration version to the service. Using the scenario presented in FIG. 6, the server's existing configuration version 664 is version "B." As a result, the server's poll will include an indication that the server is operating at version "B." If the server's version indication matches the information that the service has, then, as detailed above, the service can either ignore the server's poll, or alternatively, the service can provide a response indicating that no new configuration changes have been introduced. Alternatively, if the server's version indication does not match the information that the service has, then the service performs the subsequent operations illustrated in FIGS. 7A and 7B.

Additionally, the server's poll may also include an inquiry. For instance, prior to determining that a configuration change of a proposed configuration version has been introduced, the server's poll may include an inquiry that is usable to query the service to determine if any new configuration changes have been made since the server's last poll and/or to request any new configuration changes themselves. Accordingly, the server's poll may include an inquiry, or a query, that asks the service to perform one or more actions.

As detailed above, the server can include a plethora of information and/or requests within its poll. At a basic level, however, the server's poll includes sufficient information to enable the service to identify the server and to verify that the service has a trusting relationship with the server.

Additional benefits of using a polling operation will now be described. First, using a polling operation (as opposed to some other communication procedure) enables the service to make health determinations regarding the server. For instance, the server's frequent polling can act as a health monitor (e.g., a heartbeat), and the service can use the server's frequent polling to determine whether the server is healthy or not. By way of example, if the server has historically polled the service at a particular interval or frequency, but then deviates from that interval, the service is able to discern whether the server is no longer operating properly. As a result, the service may take remediate actions in an effort to restore the server to a healthy status (e.g., by notifying the server's administrator, by causing the server to reboot, etc.).

Each time the server polls the service, the server's poll includes an indication of the server's existing configuration version. As indicated previously, the service is the entity that manages server configurations. As a result, the service is the executive decision-making entity regarding a server's configuration, including the versions. The service is the executive decision-making entity because it retains the master copy of the server's configuration. The embodiments are designed to bring the server to the same configuration state that is stored in the service. When the service receives the server's poll, the service is able to determine whether the server is operating at the correct, or most recent, configuration version. By using polling techniques, communications between the server and the service are significantly more reliable because the service can more readily discern whether the server is healthy. If a different communication procedure were used (e.g., a push procedure), then the service may never learn, or may learn at an insufficient rate, of problems associated with the server's health and/or configuration, including its version. For example, if the service were to push configuration changes upon the server (as opposed to responding to a server's poll) and something deleterious happened to the server, the service may not learn about the event for quite some time. Accordingly, the present embodiments utilize a polling process to reliably configure an on-premise server using data stored at a cloud-based service.

Here, it is worthwhile to note that the service's response to the server's poll can also include a plethora of information. For example, the service's response may include an Etag that includes the service's identifying information and/or a return indication of the server's own identifying information. Further, the service's response may include any instructions that are to be executed by the server. In some embodiments, identifying information is included in each of the service's responses. By including this information in each service response, efficiencies are created because this saves the server from having to store any state between steps in the request/response protocol. This is preferential because it means the protocol can be interrupted and restarted at any time without requiring the server to have an ability to associate particular messages with particular conversations.

Continuing with the discussion on FIG. 7A, FIG. 7A then shows that a configuration change of a proposed configuration version has become available at the service. In other words, the configuration change was introduced via the server configuration website and is now available in a configuration table, which is maintained by the service and which has a corresponding relationship with the server.

After this configuration change becomes available, the server, according to its predetermined polling interval, again polls the service to determine whether any configuration changes have been introduced. Whereas previously no changes were available, now a configuration change is available.

Using the information included within the server's poll, which information includes data on the server's existing configuration version, the service is able to determine that the server is not operating at the proposed configuration version. To illustrate, the service compares the proposed configuration version (e.g., version "C" in configuration table 610 in FIG. 6) with the information that the service received from the server (e.g. data on the server's existing configuration version 664, or simply version "B," in FIG. 6)

to determine whether the server is operating at the proposed configuration version. Therefore, in response to this latest poll, the service analyzes the server's poll and determines that, because a configuration change has recently been introduced, the server is not operating using the new configuration change of the proposed configuration version. As a result, the service provides data regarding the configuration change back to the server, which then receives the data about the configuration change. This data includes specific information about the configuration change as well as how the server will be required to implement the configuration change. Notably, however, this set of data does not include the actual configuration change, rather, it simply contains information about the configuration change. Additionally, the service may provide one or more updates to the server configuration website 650 for an administrator to view, if so desired or established via a configuration setting.

After receiving that data (which includes information on the configuration change as well as information on how the server is to implement the configuration change), the server then performs a few processes.

One process relates to altering how often the server will perform any future polls. Whereas the server was previously polling the service at a lower frequency, now the server will begin to poll the service at a higher frequency than it was before receiving data that indicates that new configuration data is available at the service (e.g., every one or more seconds, every 5 seconds, every 7.5 seconds, every 10 seconds, etc.). One benefit of polling more frequently is that communications between 1) the service, 2) the server configuration website, and 3) the server become more responsive and thereby improve the administrator's experience because the administrator will not be required to wait as long for a response, particularly now that the reconfiguration process is underway.

Although the above discussion focused on one particular scenario where the server increased its polling, the server can increase its polling in response to other events as well. For example, in some embodiments, the server will increase its polling frequency in response to one or more of the following: 1) the sending of a particular transaction or job, 2) the receipt of a particular transaction or job, or 3) the sending or receipt of a validation communication. Notably, the polling frequency is customizable and can be tailored to a wide variety of situations. For instance, the polling frequency can be fine-tuned for a certain class of jobs or even a certain class of communications. When these classes are received or transmitted by the server, the server may react by polling more frequently. Even further, the server can dynamically alter its polling frequency multiple times throughout the process outlined in FIGS. 7A and 7B. To clarify, if the server determines that the initial increase in polling frequency is inadequate (e.g., the server may anticipate a large number of future configuration changes), then the server may further increase its polling frequency even though the server has not yet completed the entire process of receiving and implementing a configuration change. As indicated above, after an initial poll indicates that a new configuration change is available, the server and the service respond to each other as soon as they are able to in order to effectuate the new configuration change. Therefore, any future polling (i.e. any inquiry asking whether any new configuration changes are available) will be performed only after a current new configuration change is managed to completion (e.g., a successful commitment or otherwise). In some scenarios, however, the server may reduce its polling frequency. By way of example, the server may reduce its polling frequency to save, or reduce, various operational expenses (e.g., use less power, bandwidth, processor usage, network resources, etc.).

As discussed above, the server performs various processes after receiving the data about the configuration change. A second process that occurs after receiving the data from the service is a validation process. This validation process comprises the server using the received data to determine whether the configuration change can be properly implemented, or rather committed, by the server. In particular, the server uses the information transmitted by the service, which information includes detail on how the server is to implement the configuration change, to perform the validation. If the validation returns a result indicating that the configuration change is sufficiently likely to be committable by the server, then the server transmits a "success" response back to the service. In contrast, if the validation returns a result indicating that the configuration change will likely not be committable by the server, then the server transmits a "failure" response back to the service. Regardless of the result, the server will provide a notification to the service regarding the validation process.

To determine whether the configuration change is "sufficiently likely" to be committable by the server, the server may perform various different operations. For example, some embodiments use the information acquired from the service (e.g., the information on how the server is to implement the configuration change) to perform a mock, or rather simulated, configuration change at the server. Stated differently, the server simulates the changes that will need to be implemented to commit to the configuration change and then returns a result indicating whether that simulation returned a successful commit operation or a failed commit operation. Because these operations are merely simulated, no actual configuration changes are made during this process. Notably, however, while this simulation is occurring, the server analyzes the simulated processes (e.g., certain simulated actions that were previously determined to be critical for implementing the configuration change) to gauge whether the configuration change is sufficiently likely to succeed at the server. If the number of successful simulated actions satisfies a particular threshold, then the simulation will return a result indicating that the configuration change is sufficiently likely to be committable by the server. Alternatively, if the number of successful simulated actions fails to satisfy the particular threshold, then a contrary result will be returned.

Other embodiments may perform less intense operations to determine whether the configuration change is sufficiently likely to succeed. For instance, the server can acquire information on the success or failure rates of other servers that have attempted to implement similar configuration changes. After analyzing the other server's information, the server can determine whether the current configuration change is sufficiently similar to the other server's configuration changes. If a majority of the other servers were able to successfully implement their configuration changes, then the server may determine that the current configuration change also has a sufficiently high likelihood of being committable.

Some other less intense operations may include analyzing the server's current health, analyzing the server's historical success rate in making configuration changes, analyzing the server's current hardware to determine whether it is compatible with the new configuration change and/or a new rule that is to be applied, simply analyzing the information received from the service, and/or analyzing the server's current resource usage (i.e. load) to determine how much of a toll implementing the new configuration change will place on the server and whether the server will be benefited by delaying implementing the configuration change.

Regardless, if, after performing the less intense operations, the server's analysis returns a result indicating that the number of possible failure points surpasses a particular threshold level, then these embodiments will determine that the configuration change will likely not be committable by the server. Alternatively, if the analysis returns a result indicating that a number of success points surpasses a particular threshold value, then these embodiments will determine that the configuration change is sufficiently likely to be committable by the server.

In some rare instances, the server's configuration may have been manually manipulated at a prior time. By way of example, instead of using the configuration website, suppose an administrator logged directly on to the server itself and changed the server's configuration in some manner (e.g., the administrator added a new folder and manipulated various properties of that folder in the server's file system). Because the service is the executive decision-making entity with regard to configuration changes, the server's own information regarding its own configuration will not be changed when such manual changes are imposed upon it. In other words, the server's own version will not be updated to reflect that a configuration change has occurred. Therefore, the server's poll will not indicate that a configuration change has been made even though such a change has actually been made. Later, the administrator may decide to use the configuration website to perform the same configuration change. Such a scenario illustrates that the server very likely has more information about itself than the service has.

Continuing with the example, using the information contained in the server's poll, the service will determine that the server is still operating at the existing configuration version (even though the same configuration changes were actually made manually to the server) instead of the proposed configuration version, so the service will transmit data back to the server. This data includes detail on how the server should implement the configuration changes.

Next, the server will perform a validation. At this time, the server's validation will fail because the server will determine that it is not able to complete the desired transaction(s) because it has already been completed at a prior time (manually by the administrator). As a result, the server will issue a failure notification regarding the failed validation. This failure notification may include 1) specific information as to what failed during the validation process, 2) information on when the failure occurred, and/or 3) an error code associated with the failure. This information may be transmitted for any type of failure notification.

After receiving the server's validation failure notification, the service will know to cancel the transaction and may perform a rollback to a prior configuration version. Additionally, the service may perform different actions based on the result of the server's validation. For example, if the result includes a success response, then the service prepares and transmits the configuration change to the server. If needed, the service may also update the server configuration website. In contrast, if the result includes a failure response (as in the example from above), then the service may perform a rollback. More detail on this rollback process will be provided later.

As shown in FIG. 7A, the service provides the configuration change to the server, which obtains, or receives, that configuration change. Then, the server attempts to commit to the configuration change. By "commit," it is meant that the server attempts to perform various processes needed to change from an existing configuration version to a proposed configuration version where the configuration change will be implemented. This change in configuration can be performed by modifying, adding, replacing, or deleting files or directories within the server's file system. Further, this change in configuration may also include changes, additions, or deletions to file dependencies included within the file system. Even further, this change in configuration may also include changes, additions, or deletions to libraries included within the file system. Also, this configuration change may include changes to the computer system's settings and even changes to various computer system switches. Additionally, if the server successfully implemented the configuration change, then the server will update its own local configuration table to indicate that the server is operating at the proposed configuration version such that the configuration changes are being implemented. If, however, the server failed to implement the configuration changes, then the server will not update its own configuration table.

FIG. 7B shows that after the server attempts to commit to the configuration change, the server provides a commit success/failure notification to the service. This notification indicates whether the server successfully transitioned from the existing configuration version (i.e. a first version) to the proposed configuration version (i.e. a second version) in which the configuration change is being implemented. After receiving the notification from the server, the service updates its own configuration table to reflect whether the server successfully committed to the configuration change and may also update the server configuration website. In some embodiments, the service also transmits a notification back to the server regarding the service's updates to the service's configuration table.

Figure 8:
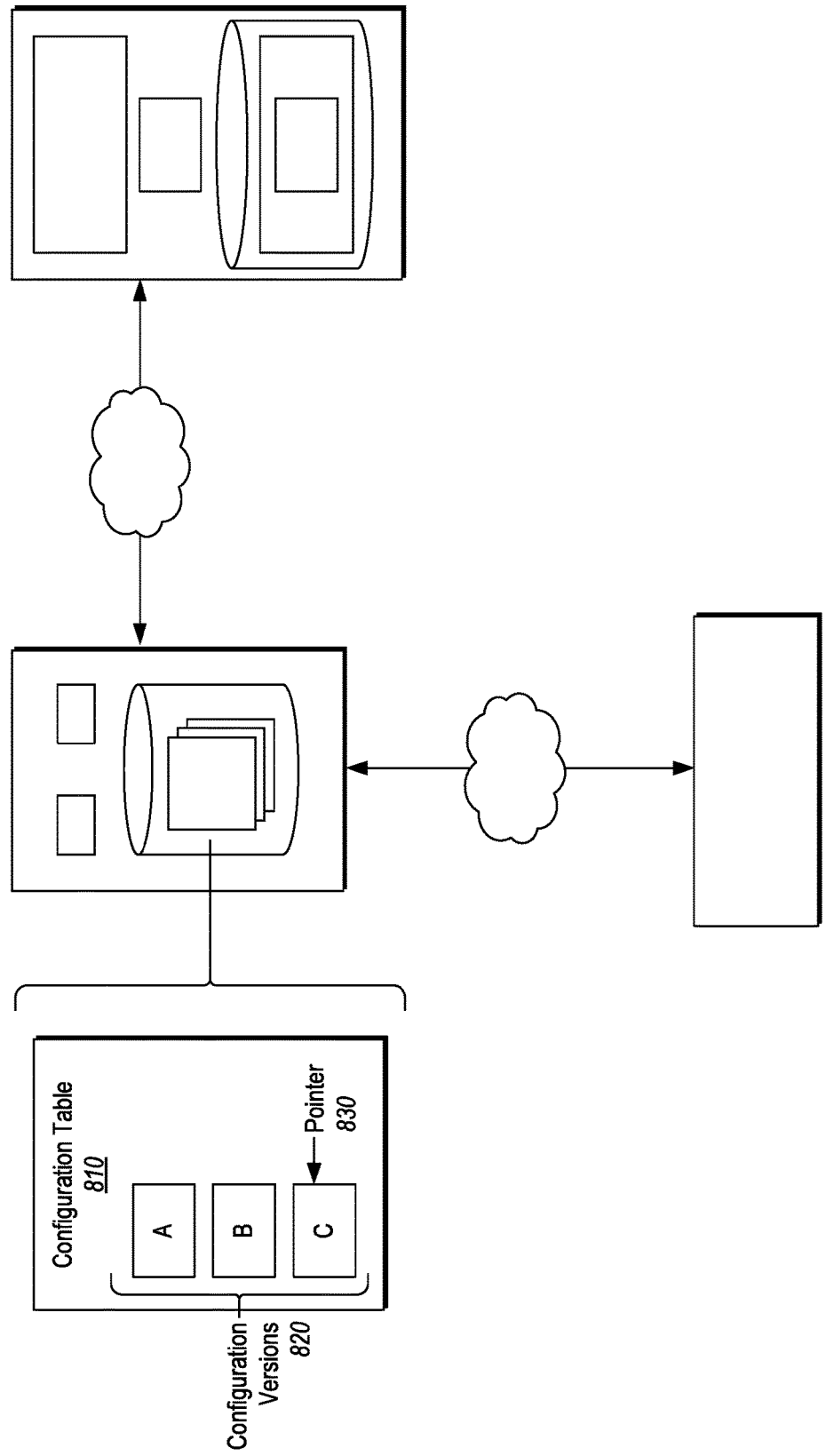
FIG. 8 illustrates an example scenario related to when a server successfully commits to a configuration change.

At this point, the server will continue to poll the service at the increased frequency for at least a predefined amount of time (e.g., 1 minute, 2 minutes, 5 minutes, or some other duration). If additional configuration changes are made, then the server will effectuate those changes to completion and will continue polling at the increased frequency. If, however, no configuration changes are introduced during that predefined time period (e.g., 1 minute, 2 minutes, 5 minutes, or some other duration), then the server reverts back to its previous polling interval and thereafter continues to occasionally poll the service to determine whether any new configuration changes have been introduced. Notably, upon successfully committing the new configuration, the new subsequent polling from the server will include Etags with identifiers associated with the updated configuration version. If, however, the server failed to implement the configuration changes, then the server will not update its own configuration table and the subsequent polling will include Etags having the previous configuration version identifier. FIG. 8 shows a scenario in which the server successfully committed to the configuration change. Specifically, FIG. 8 illustrates a cloud-based service's configuration table 810, which is similar to the configuration table 610 in FIG. 6. This configuration table 810 corresponds to the server that successfully committed to the configuration changes. As shown, this configuration table 810 includes various server configuration versions 820 (e.g., versions "A," "B," and "C") and a pointer 830.

Here, it is worthwhile to note that the cloud-based service, although not necessary, often utilizes an optimistic approach with regard to configuration changes. To clarify, after receiving a configuration change, the cloud-based service automatically begins to advertise that a configuration change of a proposed configuration version (e.g., version "C") is available for retrieval and should be implemented. The cloud-based service performs this action without first verifying whether the server can successfully commit to the configuration change. Notably, only in response to a failure notification (e.g., that the server failed to commit to the configuration change, that the server's validation returned a failure result, etc.) will the cloud-based service roll back to an existing configuration version (e.g., version "B" in FIG. 8) from the proposed configuration version (e.g., version "C" in FIG. 8).

In the scenario presented in FIG. 8, as soon as the configuration change becomes available at the configuration table 810, the pointer 830 transitions from an existing configuration version (e.g., version "B") to a proposed configuration version in which the configuration change is to be implemented. After the cloud-based service receives a notification from the server indicating that the server successfully committed to the configuration change, the pointer 830 remains pointing at the proposed configuration version (e.g., version "C") in which the configuration change is being implemented. In some instances, previous versions (e.g., version "B") may also be deleted. In other instances, the previous versions remain, but the pointer simply points to the correct current version.

Figure 9:
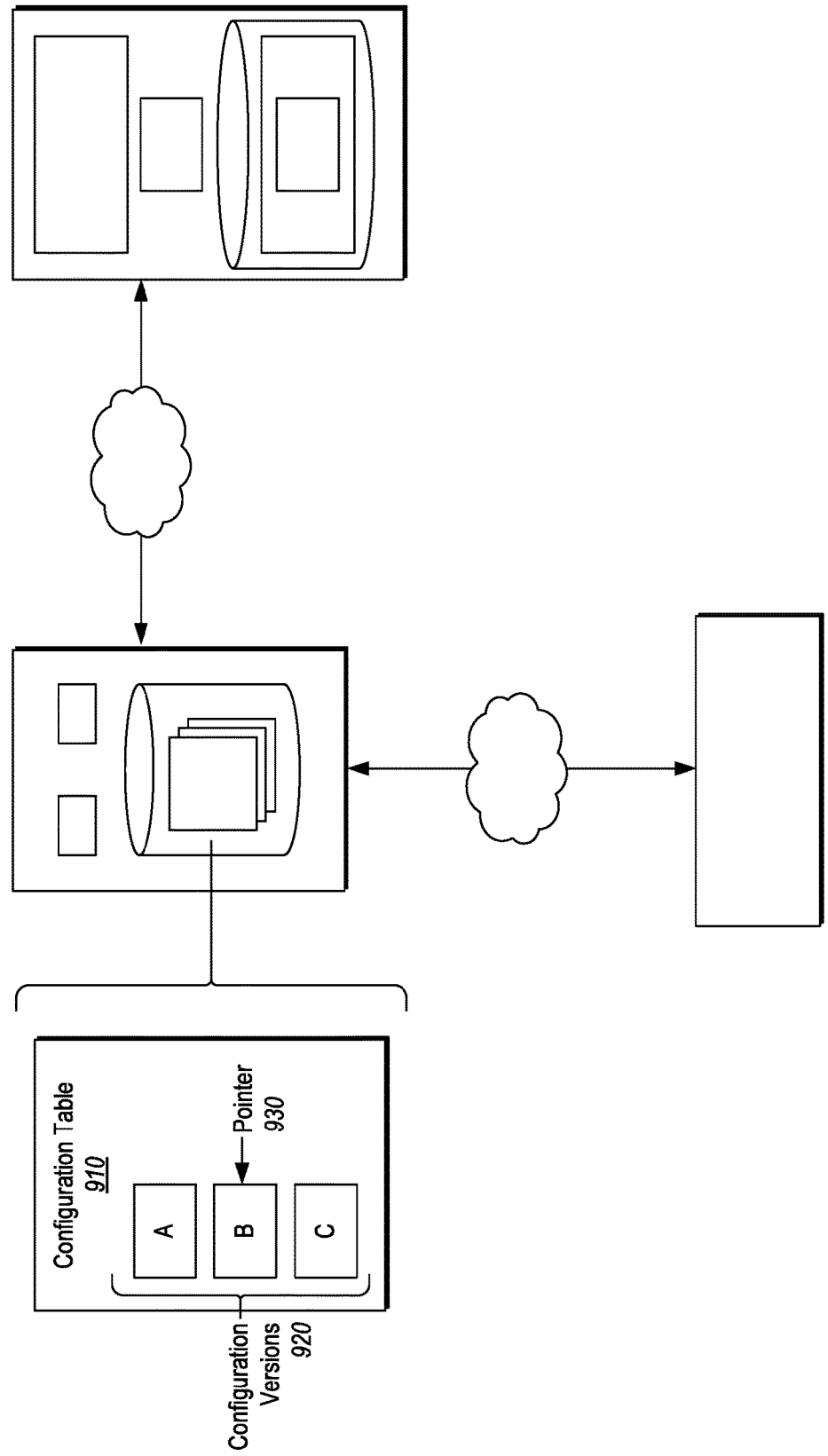
FIG. 9 illustrates an example scenario related to when a server fails to commit to a configuration change.

In some instances, the service will receive a failure notification (e.g., the server failed in its attempt to commit to the configuration change, the server's validation failed, etc.). When such a situation occurs, then the service may perform a rollback operation. This process of rolling back is illustrated in FIG. 9. Specifically, FIG. 9 shows a cloud-based service's configuration table 910. This configuration table 910 is associated with the server that failed to implement the configuration change. Further, this configuration table 910 is similar to the configuration table 810 of FIG. 8. Configuration table 910 is also shown as including various configuration versions 920 (e.g., versions "A," "B," and "C") and a pointer 930.

As indicated above, the service is optimistic in nature. As a result of being optimistic, the service, upon receiving the configuration change (and without waiting to determine whether the server can implement this change) causes the pointer 930 to point to a proposed configuration version (e.g., version "C" in FIG. 9) in which the configuration change is to be implemented. However, in response to a failure notification from the server, the service's configuration table 910 will roll back to an existing configuration version (e.g., version "B" in FIG. 9) in which the latest configuration change is not to be implemented. In other words, in response to the server's failure notification, the cloud-based service rolls back by causing the pointer 930 to point to an earlier configuration version. It will be appreciated that in some instances, instead of being optimistic, the service is pessimistic. By "pessimistic," it is meant that the service will not automatically assume that a change has been or will be implemented by the server. As a result, the service does not fully pledge itself to the change until after a commit confirmation has been received from the server. Here, this process (i.e. not fully pledging) can be performed in a variety of ways. For example, the service may store the change only in volatile memory until the server fully commits. In other embodiments, the service may mark the change (e.g., using an Etag associated with the change) to indicate that the change has not yet been fully committed by the server.

While the above discussion focused on the use of a pointer for facilitating the management of a server's configuration (including its versions), some embodiments do not utilize a pointer. Instead, these embodiments simply delete the configuration change of a proposed configuration version when the service receives a failure notification (e.g., when the server fails to commit to that proposed configuration version, when the server's validation returns a failure result, etc.). Accordingly, for these embodiments, the "rollback" process simply includes a deletion act as opposed to transitioning a pointer from one configuration version to another.

Still further, other embodiments may perform other actions prior to performing a rollback. For instance, some embodiments will contact an administrator regarding the server's failure notification and then wait some predetermined time for input from the administrator on how to proceed. In contrast, some embodiments will attempt to automatically "fix" the server by forcing the server to revert back to a base, or first/initial, configuration version. Once the server is at the base configuration version, then the service will walk the server through all of the various configuration changes until the server finally arrives at a configuration version in which the latest, or most up-to-date, configuration change is being implemented. Notably, this process may be time-intensive as it requires the server to reboot to an old configuration version and then requires the server to potentially implement a large number of configuration changes prior to reaching the configuration version in which the most recent changes are to be implemented. In some embodiments, instead of causing the server to revert back to a base configuration version, the service may cause the server to revert back only one, two, three, or more prior configuration versions (as opposed to reverting all the way back to the base configuration version). Accordingly, these examples are provided merely to illustrate the broad versatility of the current embodiments and should not be viewed as limiting.

At this stage, it is worthwhile to note the difference between 1) a server's "configuration" and 2) a "job" that is used to update the server's configuration. A configuration consists of all of the files, directories, dependencies, and/or libraries needed for a server to operate in a desired manner. During the processes described above, the server's entire configuration is not transmitted back and forth between the server and the service. Instead, only small transactional files or data packets are transmitted back and forth. These small transactional files relate to the configuration changes that are being made, not to an entire configuration. Further, these small transactional files are contained within a job and are designed to move the server's configuration forward when a configuration change is received at the service. Although this disclosure used the term "job," it will be appreciated that any comparable process for transmitting data can also be used.

In some embodiments, the service includes a control component (e.g., control component 220 in FIG. 2) that manages the configuration changes that need to be made to a server. This control component creates a job for that server to perform so the server can locally implement the configuration changes. To do so, the control component creates a plurality of transactional operations and then bundles these operations within a job, which the server will later perform. Using this control component, the service acts as the executive entity with regard to how server configurations are managed and delivered, which delivery is accomplished through use of a job. It will be appreciated that a job does not contain an entire configuration. Instead, a job contains only the information needed for a server to locally implement the configuration changes. In other words, the job includes only those files, directors, dependencies, and/or libraries needed to make the configuration change. The job does not include all of the files, directories, dependencies, and/or libraries of the entire configuration. As a result, a job normally does not require a significant amount of bandwidth because only a relatively small amount of information is normally included within a job.

In some situations, however, a job will encompass a larger number of transactions such that it will require a large amount of bandwidth. By way of example, suppose a server's configuration has already transitioned from version "A" to "B" to "C." After transitioning to version "C," the server may crash. As a result of this crash and in order to continue operating, the server may be forced to resort back to an earlier configuration version (e.g., version "A"). After the server again begins to poll the service, the service will determine that the server is not operating at a configuration version that includes the most recent configuration changes. As a result, the control component will create a job for the server. When the server performs this job, the server will eventually transition from configuration version "A" to configuration version "C." Therefore, in this situation, more bandwidth will be required to facilitate the server's change from configuration version "A" to configuration version "C" because of the larger number of transactions that will be required to transmit that configuration change. Stated differently, this increase in bandwidth is required because there is a much larger configuration "jump" involved.

Normally, however, the service does not transmit a large amount of configuration data (e.g., configuration versioning or history) during the processes described herein because the server normally does not need to implement such an extensive configuration change.

It will also be appreciated that the ordering of the steps for each job matters (e.g., transitioning a server from configuration version "B" to configuration version "C"). As indicated above, the embodiments employ a stateless protocol used to send requests and responses. When information is received from such a request, that information may be concatenated with previously-received and/or later-received information to finalize the creation of the job at the server's end. Accordingly, the ordering in which a job is processed matters to ensure that any configuration changes are properly implemented. To clarify, all of the information needed to complete the job might not be delivered in a single data package. Instead, the job might constitute a plurality of data packages transmitted from the service to the server. When received, the server may be required to concatenate this plurality of data packages in order to complete the job. As a result, the received data packages may need to be organized in a certain order. Accordingly, the present embodiments are able to organize the contents of a job into an ordered flow for processing.

Here, an example will be helpful. Suppose two servers (e.g., server1 and server2) are interacting with the service. In this example, both server1 and server2 are running configuration version one. An administrator may use the server configuration website to introduce a configuration change that is to be implemented by both server1 and server2, which configuration change will cause a new version to be created and to be published at the service. Although both server1 and server2 are running the same configuration version, the service's control component will two independently create unique jobs, one job for server1 and a different job for server2. The service will create two different jobs because although server1 and server2 are running the same configuration version, server1's current operational state may be different than server2's current operational state. In other words, each server is unique and will require a customized job. To clarify, in order to properly implement the new configuration change of the proposed configuration version, server1 may have to perform different processes than server2. Therefore, although the configuration change of the proposed configuration version may be the same for both server1 and server2, the jobs that each server will perform may be different. Accordingly, in view of this discussion, it will be appreciated that a configuration (and a configuration change) is different than a job.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. The methods are implemented by one or more processors of a computer system (e.g., the computer system 100 of FIG. 1). By way of example, a computer system includes one or more computer-readable hardware storage media that stores computer-executable code. This computer-executable code is executable by the one or more processors to cause the computer system to perform these methods.

Figure 10:
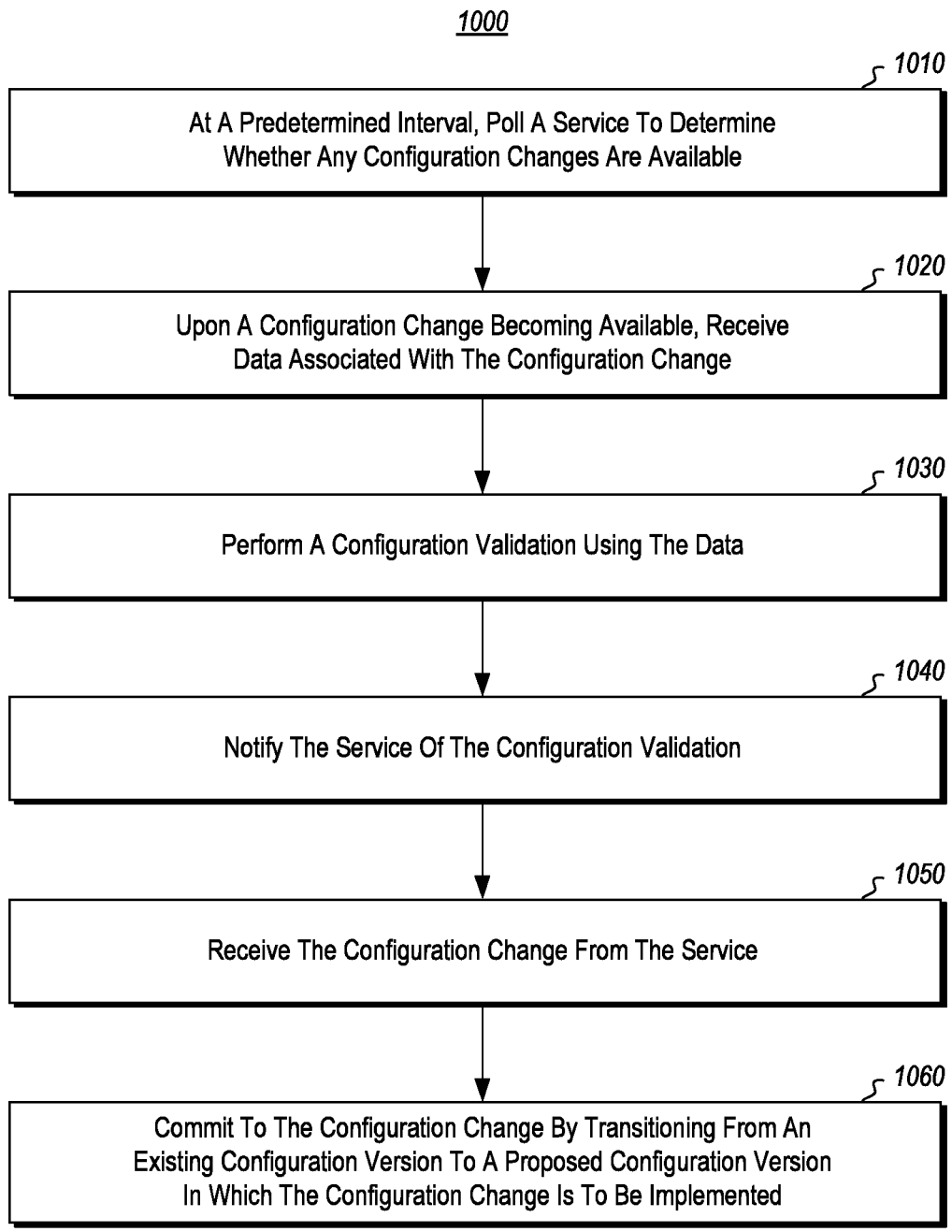
FIG. 10 illustrates an exemplary method for reliably configuring an on-premise server using information stored at a cloud-based service.

FIG. 10 illustrates an exemplary method 1000 for reliably configuring an on-premise server using configuration data stored at a cloud-based service.

Specifically, method 1000 includes an act (act 1010) of the on-premise server polling the cloud-based service to determine whether one or more new configuration changes are available at the cloud-based service. Here, the on-premise server's polling is initially performed at a predetermined first interval (e.g., every 10 seconds, 20 seconds, 30 seconds, etc.). Notably, the predetermined first interval can be any interval and is not limited merely to the values recited above. The polling also includes transmitting a data packet from the on-premise server to the cloud service, where this data packet includes information about the on-premise server's existing configuration version. For example, in some embodiments, the data packets include the server's identity (e.g., a Server-Identifier) and an Etag, which may include information about the server's configuration version (e.g., a Configuration-Version-Identifier). Here, this polling is performed by the polling component 468 of the server 460 illustrated in FIG. 4. Similarly, the process of acquiring the information about the on-premise server's existing configuration version is performed by the version component 464. Furthermore, the timing component 466 determines the predetermined first interval. It will also be appreciated that the on-premise server utilizes a stateless request-response protocol to communicate with the cloud-based service according to the manner described earlier.

The method 1000 also includes act 1020 where, upon a new configuration change of a proposed configuration version becomes available at the cloud-based service, the on-premise server receives data associated with the new configuration change of the proposed configuration version. This act is performed by the polling component 468. This data includes information describing how the on-premise server is to locally implement the new configuration change of the proposed configuration version. As discussed earlier, an administrator can use a server configuration website to introduce server configuration changes. These configuration changes are maintained within one or more of the cloud-based service's configuration tables, and particularly within a configuration table that corresponds with the server that is to implement the configuration changes.

After the new configuration change of the proposed configuration version becomes available at the cloud-based service, some on-premise servers will alter their polling frequency. For example, after an on-premise server polls the cloud-based service and learns that a new configuration change is available, the on-premise server may cause future polling to be performed at a second predetermined interval (e.g., every 5 seconds, 7.5 seconds, 10 seconds, etc.). Here, the second predetermined interval may be any value and is not limited to merely the values recited above. Notably, however, when operating under the second predetermined interval, the on-premise server polls more frequently than when operating under the first predetermined interval.

Next, the method 1000 is shown as including act 1030 in which the on-premise server performs a configuration validation using the received data, which data includes information on the configuration change and information on how the on-premise server is to implement the configuration change. Here, this act is performed by the validation component 470 according to the manner described earlier.

Method 1000 also includes act 1040 in which the on-premise server notifies the cloud-based service of the configuration validation. Here, this act is performed by the polling component 468. Further, the on-premise server may additionally provide a variety of other information when it notifies the cloud-based service. For instance, the on-premise server may notify the cloud-based service of a successful result from the configuration validation. In response to such a successful notification, the cloud-based service will then transmit the new configuration change to the on-premise server. Alternatively, the on-premise server may notify the cloud-based service of a failure result from the validation. Under such a scenario, the cloud-based service may perform a rollback according to the processes described earlier.

FIG. 10 then shows that method 1000 includes act 1050 where, subsequent to notifying the cloud-based service of the configuration validation, the on-premise server receives the new configuration change of the proposed configuration version from the cloud-based service. This act is also performed by the polling component 468.

In some situations, the new configuration change may have been customized specifically for the on-premise server such that the new configuration change is available for commitment only by the on-premise server. By way of example, suppose a plurality of on-premise servers are interacting with the cloud-based service. However, an administrator may desire to modify, update, or even replace only a single on-premise server's configuration. As a result, that administrator may introduce one or more configuration changes to the cloud-based service, which configuration changes are specific for only that single on-premise server. The cloud-based service will then prepare a job that is specifically tailored for the single on-premise server and that is designed to cause the single on-premise server to transition from one configuration version to a different configuration version in which the new configuration changes will be implemented.

In other instances, however, a subset of on-premise servers may all be operating using a similar configuration, and particularly a similar configuration version. In this example, the administrator may desire to impose a configuration change to all of those servers' configurations. As a result, the administrator will introduce a configuration change that has been designed to be applicable to each on-premise server in the subset. Notably, while the configuration change may be the same for each on-premise server, the cloud-based service will tailor a customized job for each of those on-premise servers. Accordingly, the new configuration change is now available for commitment by a plurality of on-premise servers. To further clarify, the jobs that are created by the cloud-based service will be different for each of those on-premise servers because each on-premise server is unique (even though each on-premise server is implementing a similar configuration and configuration version).

Method 1000 then includes act 1060 in which the on-premise server commits to the new configuration change by transitioning from the on-premise server's existing configuration version to a proposed configuration version in which the configuration changes received from the cloud-based service will be implemented. Here, this act is performed by the version component 464.

In some instances, however, the on-premise server may fail to commit to the new configuration changes. When this occurs, the on-premise server will then issue a failure notification to the cloud-based service. This failure notification may include an Etag that is associated with the server's configuration and/or version. Further, this failure notification may indicate that the cloud-based service is to perform a configuration rollback according to the principles and processes described earlier.

As also described earlier, a configuration change includes a plurality of discreet transactions that are to be performed by an on-premise server to transition the on-premise server from an existing server configuration version to a server configuration version in which the configuration changes will be implemented. To facilitate the transmission of the configuration change, the cloud-based service creates a job that includes various discrete transactions. This job is then performed by the on-premise server to implement the desired configuration changes.

If the on-premise server changed its polling frequency, then, in some instances, the on-premise server will continue to poll at this increased frequency for at least a predetermined period of time. If no new configuration changes are introduced during that predetermined period of time, then the on-premise server will revert back to polling the cloud-based service according to the first predetermined interval. As discussed above, the on-premise server includes an agent component that determines how often the on-premise server is to poll the cloud-based service. To clarify, this agent component determines the predetermined first interval of polling. Further, the agent component also causes the on-premise server to poll at the first predetermined interval when one or more conditions are satisfied (e.g., prior to a new configuration change becoming available) and at a second predetermined interval when one or more different conditions are satisfied (e.g., after a new configuration change is available and/or during a predetermined period of time).

Figure 11:
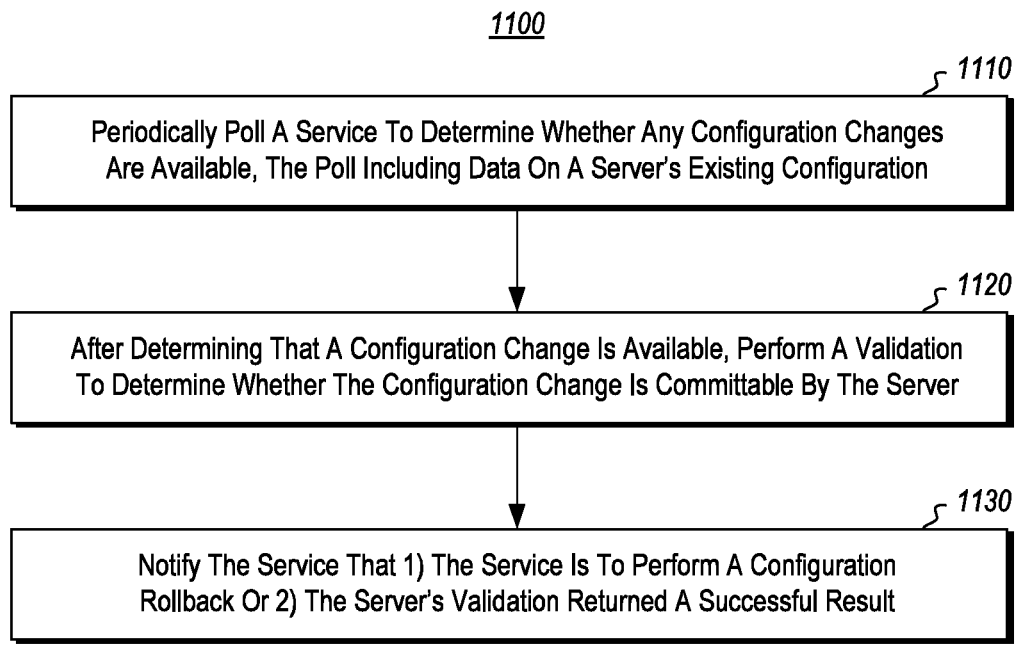
FIG. 11 illustrates another exemplary method for reliably configuring an on-premise server using information stored at a cloud-based service.

FIG. 11 illustrates another exemplary method 1100 that is implemented by a computer system (e.g., the computer system 100 of FIG. 1).

Here, method 1100 is shown as initially including act 1110 in which an on-premise server periodically polls a cloud-based service to determine whether one or more new configuration changes are available at the cloud-based service. This polling includes transmitting data to the cloud-based service. In particular, this data includes information regarding the server's existing configuration version. Here, this act is performed by the polling component 468 of the server 460 in FIG. 4.

If the cloud-based service does have any new configuration changes, these new configuration changes will be included in a configuration table of the cloud-based service, which configuration table can be updated in response to various events (e.g., notifications from the on-premise server).

Method 1100 then includes act 1120 in which the on-premise server, after determining that a new configuration change is available at the cloud-based service, performs a validation to determine whether the new configuration change is committable by the on-premise server. Here, this act is performed by the validation component 470 of server 460 in FIG. 4.

Method 1100 also includes act 1130 in which the on-premise server provides a notification to the cloud-based service regarding the on-premise server's validation. In particular, this notification either informs the cloud-based service that 1) the cloud-based service is to perform a configuration rollback or 2) the on-premise server's validation returned a successful result. This act is performed by the polling component 468 of the server 460 in FIG. 4. When the notification dictates that a configuration rollback is to be performed, it means the on-premise server was not able to validate the configuration change.

In some embodiments, when the cloud-based service is to perform the configuration rollback, the cloud-based service performs the configuration rollback by causing a pointer to point to a prior, or previously existing, server configuration version (e.g., a previous configuration version that was used prior to receiving the new configuration change) as opposed to pointing to a server configuration version where the new configuration change is being implemented.

In other embodiments, when the cloud-based service is to perform the configuration rollback, the cloud-based service performs the configuration rollback by 1) deleting a configuration change of a proposed configuration version and 2) retaining an existing configuration version where the new configuration change is not being implemented.

Figure 12:
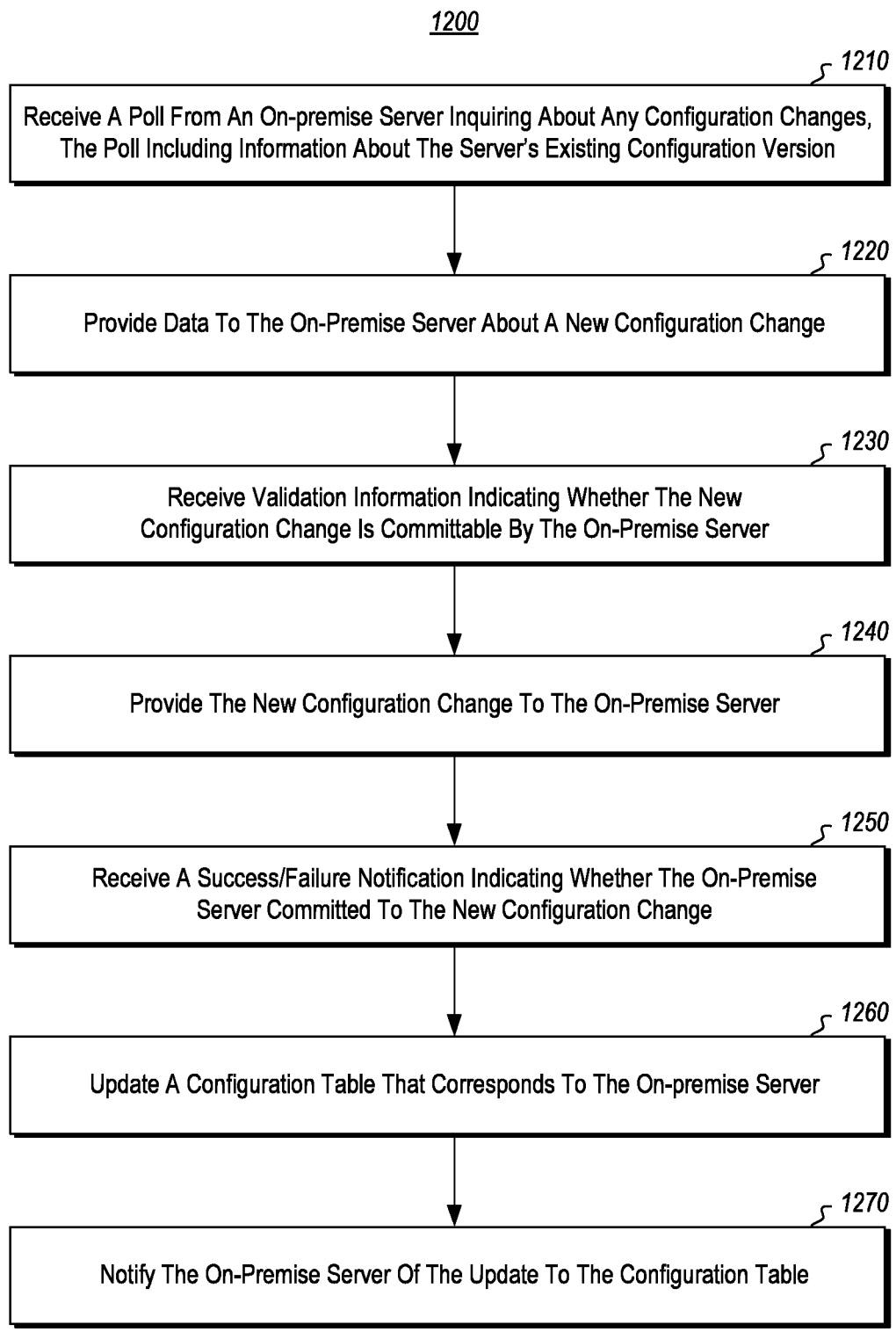
FIG. 12 illustrate another exemplary method for reliably configuring an on-premise server using information stored at a cloud-based service.

While the above methods were from the on-premise server's perspective, the exemplary method depicted in FIG. 12 is from the cloud-based service's perspective.

In particular, FIG. 12 illustrates a method 1200 that initially includes an act 1210 in which a cloud-based service periodically receives a poll from an on-premise server. The on-premise server is using this poll to inquire about any new configuration changes that are available at the cloud-based service. Further, the on-premise server's poll includes information regarding the on-premise server's existing configuration version.

Method 1200 also includes act 1220 in which the cloud-based service, after identifying that a new configuration change is available for the on-premise server, provides data regarding the new configuration change to the on-premise server. This data specifically relates to the new configuration change (e.g., the data includes information on how the on-premise server is to implement the new configuration change).

Next, method 1200 includes act 1230. Here, the cloud-based service receives validation information from the on-premise server. This validation information indicates whether the new configuration change is committable by the on-premise server.

Act 1240 is then illustrated. Here, the cloud-based service provides the new configuration change to the on-premise server.

Then, method 1200 includes act 1250 in which the cloud-based service receives a success/failure notification from the on-premise server. This success/failure notification indicates whether the on-premise server committed to the new configuration change.

Method 1200 then includes act 1260 in which the cloud-based service updates its own configuration tables. In particular, the cloud-based service updates a configuration table that has been specifically configured for the on-premise server.

Lastly, method 1200 is shown as including act 1270 in which the cloud-based service provides a notification to the on-premise server. This notification includes information relating to the update to the configuration table that is maintained by the cloud-based service and that corresponds to the on-premise server.

To further elaborate on the polling process, some embodiments use one or more variations on the polling process. For instance, some embodiments use notifications. For these embodiments, a notification can work in one of two ways.

A first way includes the server using a long-poll or web socket (or some variation of that process) to reach to a service to look for a notification that the server should connect to a primary service for a new configuration change. Such an embodiment has the benefit of being relatively cheap to operate. Accordingly, the generalized processes described herein are substantially similar, but the path being used to start a transaction is slightly different for these notification embodiments.

A second way includes a channel that is built in which the service does reach into the server to make changes. Some user scenarios do prefer opening up a port to the server so the service can reach in. Here, the protocol is essentially the same, except that the service reaches in to the server.

Accordingly, the present embodiments provide significant advantages over the current technology by making new server configuration changes available in a significantly more reliable manner.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A server computer system comprising:
   one or more processors; and
   one or more computer-readable hardware storage media having stored thereon computer-executable instructions, the computer-executable instructions being executable by the one or more processors to cause the server computer system to be reliably configured using configuration data stored at a cloud-based service and by causing the server computer system to:
   at a predetermined first interval, poll the cloud-based service to inquire whether any new configuration changes are available, wherein polling the cloud-based service includes transmitting a data packet that includes information relating to an existing configuration version that is currently being used by the server computer system;

upon a determination by the cloud-based service that a new configuration change is available for the server computer system, receive data associated with the new configuration change from the cloud-based service;

perform a configuration validation using the data;

notify the cloud-based service of the configuration validation;

subsequent to notifying the cloud-based service, receive the new configuration change from the cloud-based service; and commit to the new configuration change by transitioning from the existing configuration version to a proposed configuration version in which the new configuration change received from the cloud-based service is to be implemented.

2. The server computer system of claim 1, wherein the server computer system uses a stateless request-response protocol to communicate with the cloud-based service.

3. The server computer system of claim 1, wherein, after the new configuration change becomes available at the cloud-based service, the server computer system performs future polls at a second predetermined interval for at least a predetermined period of time.

4. The server computer system of claim 3, wherein the server computer system, while at the second predetermined interval, polls the cloud-based service more frequently than while at the first predetermined interval.

5. The server computer system of claim 3, wherein, after the predetermined period of time has elapsed and after determining that no new configuration changes have been introduced during that predetermined period of time, the server computer system reverts back to polling the cloud-based service at the first predetermined interval.

6. The server computer system of claim 1, wherein the data associated with the new configuration change includes information on how the server computer system is to process the new configuration change.

7. The server computer system of claim 1, wherein notifying the cloud-based service of the configuration validation includes providing a notification to the cloud-based service of either a successful result or a failure result of the configuration validation.

8. The server computer system of claim 1, wherein the new configuration change is customized specifically for the server computer system such that the new configuration change is available for commitment only by the server computer system.

9. The server computer system of claim 1, wherein the new configuration change is available for commitment by a plurality of server computer systems, the plurality of server computer systems including the server computer system.

10. The server computer system of claim 1, wherein the new configuration change comprises a plurality of discreet transactions that are to be performed to complete the transition from the existing configuration version to the proposed configuration version.

11. The server computer system of claim 1, wherein the new configuration change is introduced to the cloud-based service from a server configuration website that is associated with the cloud-based service, whereby the new configuration change is remotely delivered from the server configuration website through the cloud-based service to the server computer system.

12. A method for reliably configuring a server using configuration data stored at a remote service, the method being implemented by the server and comprising:

at a predetermined first interval, polling the remote service to inquire whether any new configuration changes are available, wherein polling the remote service includes transmitting a data packet that includes information relating to an existing configuration version that is currently being used by the server;

upon a determination by the cloud-based service that a new configuration change is available for the server computer system, receive data associated with the new configuration change from the cloud-based service;

perform a configuration validation using the data;

notify the remote service of the configuration validation;

subsequent to notifying the remote service, receive the new configuration change from the remote service; and commit to the new configuration change by transitioning from the existing configuration version to a proposed configuration version in which the new configuration change received from the remote service is to be implemented.

13. The method of claim 12, wherein the stateless request-response protocol is driven by the server, and wherein management of configuration changes, which include the new configuration change, is driven by the remote service.

14. The method of claim 12, wherein, in response to the server failing to commit to the new configuration change, the method further comprises:

causing the server to issue a failure notification to the remote service, the failure notification including an Etag that is associated with the server's existing configuration version, the failure notification further indicating that the remote service is to perform a configuration rollback.

15. The method of claim 12, wherein the server includes an agent component that determines how often the server is to poll the remote service such that the agent component determines the predetermined first interval, and wherein the agent component causes the server to poll at the first predetermined interval when one or more conditions are satisfied and at a second predetermined interval when one or more different conditions are satisfied.

16. A server computer system comprising:

one or more processors; and one or more computer-readable hardware storage media having stored thereon computer-executable instructions, the computer-executable instructions being executable by the one or more processors to cause the server computer system to be reliably configured using configuration data stored at a cloud-based service by causing the server computer system to:

periodically poll the cloud-based service to determine whether any new configuration changes are available at the cloud-based service, wherein polling the cloud-based service includes transmitting data relating to an existing configuration version that is currently being used by the server computer system;

after determining by the cloud-based service that a new configuration change is available for the server computer system, receive data associated with the new configuration change from the cloud-based service;

perform a validation to determine whether the new configuration change is committable by the server computer system; and notify the cloud-based service that 1) the cloud-based service is to perform a configuration rollback or 2) the validation returned a successful result.

17. The server computer system of claim 16, wherein the new configuration change is included within a configuration table of the cloud-based service.

18. The server computer system of claim 16, wherein the configuration rollback comprises the cloud-based service causing a pointer to point to a previous configuration version where the new configuration change is not to be implemented.

19. The server computer system of claim 16, wherein the configuration rollback comprises the cloud-based service deleting the new configuration change and retaining a previous configuration version where the new configuration change is not to be implemented.

20. The server computer system of claim 16, wherein notifying the cloud-based service that the validation returned the successful result comprises the server computer system committing to the new configuration change.

* * * * *